United States Patent
Doppelt et al.

[11] Patent Number: 5,969,637
[45] Date of Patent: *Oct. 19, 1999

[54] GARAGE DOOR OPENER WITH LIGHT CONTROL

[75] Inventors: Loren E. Doppelt, Palatine; James J. Fitzgibbon, Streamwood; John V. Moravec, Willow Springs, all of Ill.

[73] Assignee: The Chamberlain Group, Inc., Elmhurst, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/637,238

[22] Filed: Apr. 24, 1996

[51] Int. Cl.[6] .............................. H02P 1/00; E05F 15/02; G08C 19/00
[52] U.S. Cl. .............................. 340/825.69; 49/26; 49/27; 49/28; 318/266
[58] Field of Search ........................ 340/825.69, 825.62, 340/825.53, 542, 825.56, 825.72, 825.8, 825.31, 825.22; 307/141.4; 49/13, 14, 25, 24, 30, 36

[56] References Cited

U.S. PATENT DOCUMENTS

| | | | |
|---|---|---|---|
| 3,716,865 | 2/1973 | Willmott | 343/225 |
| 4,064,404 | 12/1977 | Willmott et al. | 49/13 |
| 4,638,433 | 1/1987 | Schindler | 364/400 |
| 4,716,301 | 12/1987 | Willmott et al. | 307/115 |
| 4,868,409 | 9/1989 | Tanaka et al. | 307/10.5 |
| 4,922,168 | 5/1990 | Waggamon et al. | 318/286 |
| 5,189,412 | 2/1993 | Mehta et al. | 340/825.22 |
| 5,226,257 | 7/1993 | Moss | 49/13 |
| 5,282,337 | 2/1994 | Duhame et al. | 49/199 |
| 5,470,185 | 11/1995 | Tsubota et al. | 414/264 |
| 5,576,701 | 11/1996 | Heitschel et al. | 340/825.31 |
| 5,589,747 | 12/1996 | Utke | 318/468 |
| 5,625,980 | 5/1997 | Teich et al. | 49/26 |
| 5,661,804 | 8/1997 | Dykema et al. | |
| 5,774,065 | 6/1998 | Mabuchi et al. | 340/825.72 |

*Primary Examiner*—Michael Horabik
*Assistant Examiner*—Anthony A. Asongwed
*Attorney, Agent, or Firm*—Fitch, Even, Tabin & Flannery

[57] ABSTRACT

A garage door operator with light control includes a garage door movement apparatus for moving the garage door in an open and in a close direction within a doorway, a light having an on and an off state, a controller for generating a door movement signal for operating the door movement apparatus and for generating a light enable signal for operating the light in one of a plurality of on and off states and an obstacle detector for detecting the presence of an obstruction in the doorway. The controller responds to the door state (traveling open, traveling closed and stopped open) in order to control operation of the door and activation of the lights. When the door state indicates the door is stopped open and the obstacle detector detects an obstruction in the doorway, the controller generates a light enable signal for enabling the light.

10 Claims, 32 Drawing Sheets

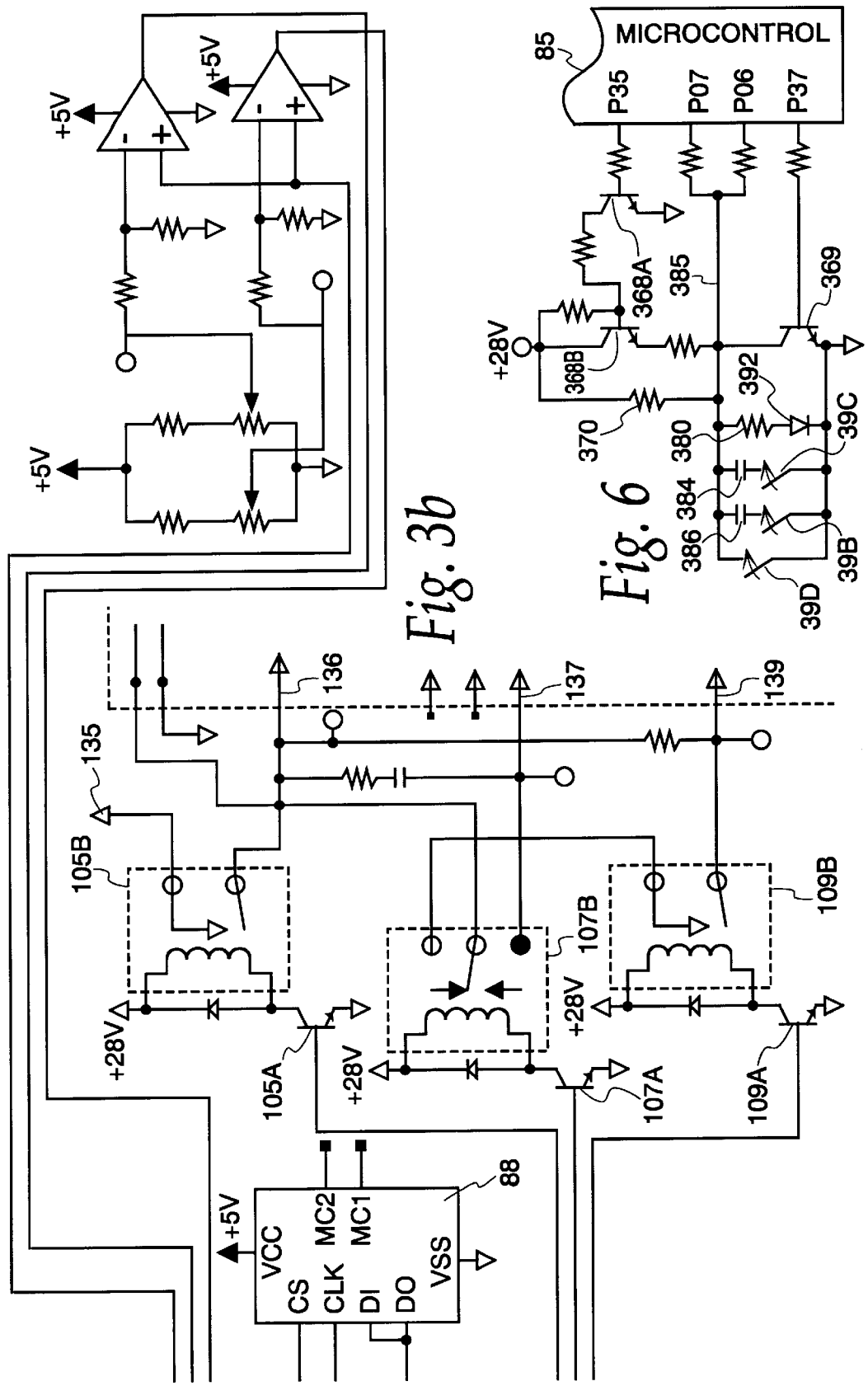

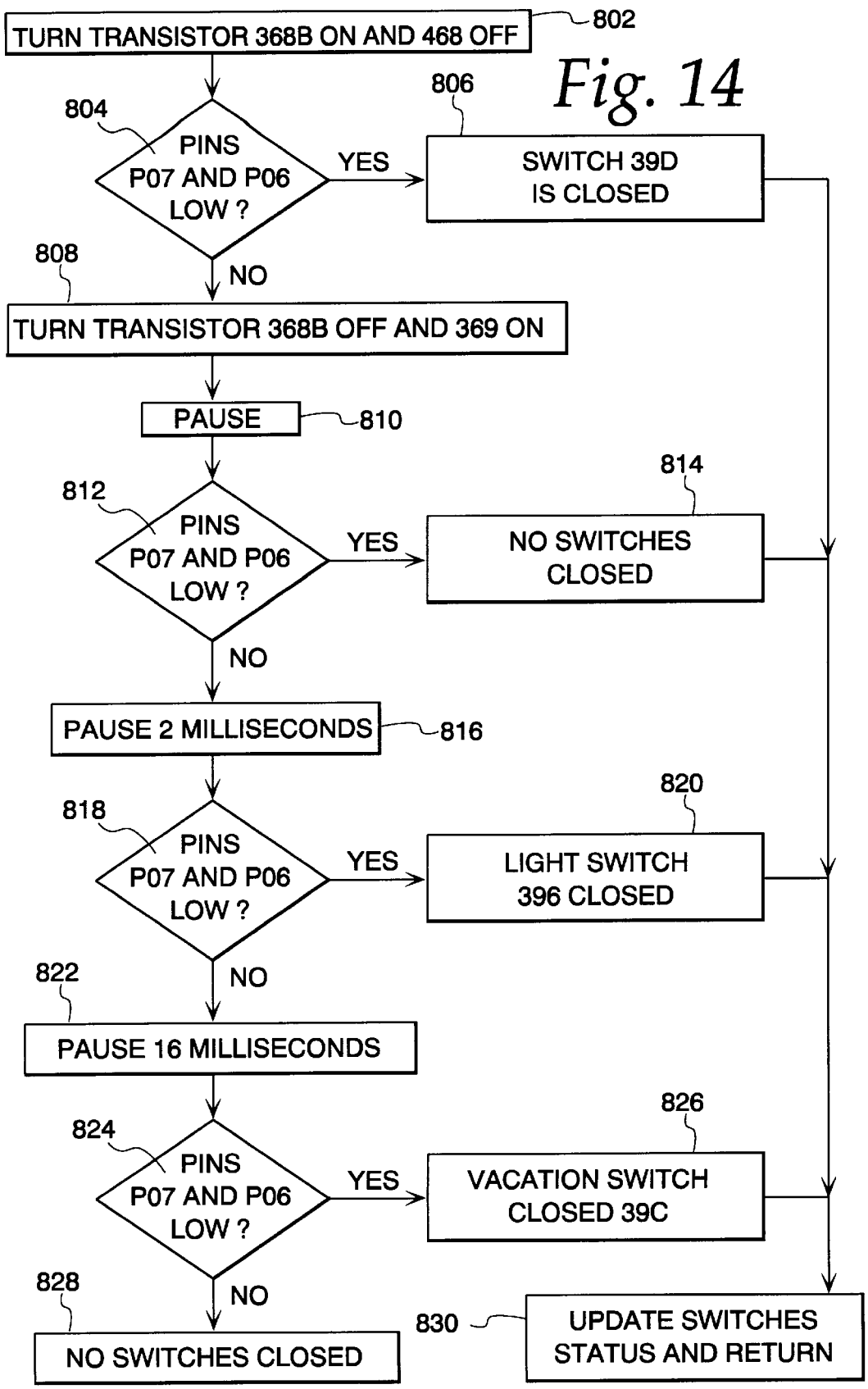

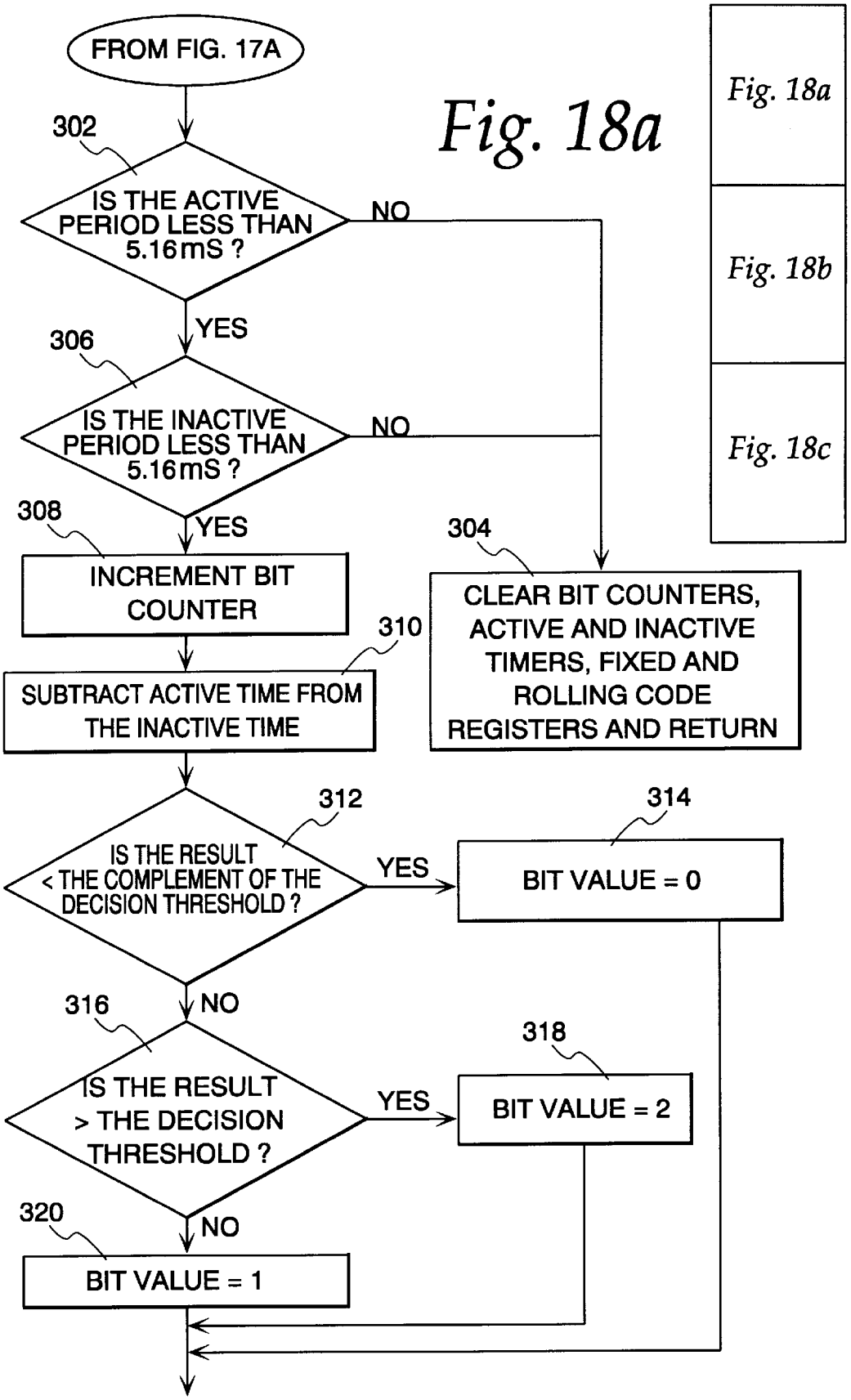

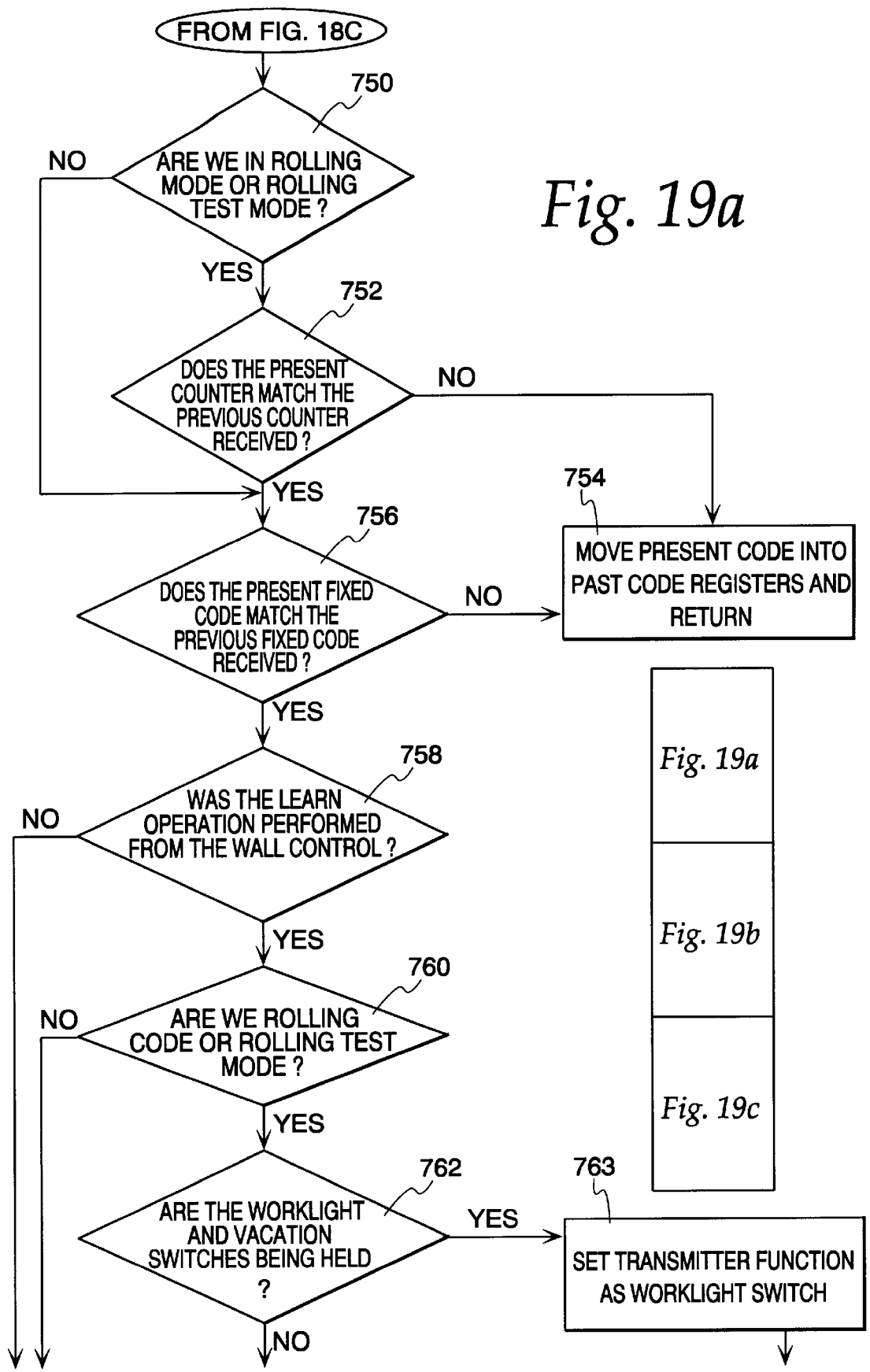

GARAGE DOOR OPENER WITH LIGHT CONTROL

BACKGROUND OF THE INVENTION

This invention relates to remotely controlled garage door opening apparatus and more particularly, to such apparatus integrally combined with remotely controlled lighting.

Remotely controlled garage door openers include associated garage lights which are turned on automatically when a garage door movement is commanded from a remote transmitter. A remote transmitter sends a predetermined coded signal to which a receiver responds by activating a garage door moving device and the associated lights. The lights remain on for a preset period of time to permit lighted use of the garage, then automatically turn off.

With such known garage door openers, a user can activate the system when preparing to leave a closed garage and the lights will be turned on for the predetermined period. If the user exits the garage before the predetermined period expires, then a lighted exit is provided. Similarly, when a user arrives at a closed garage door, he or she can activate the door opener, the door will open and the lights will be turned on and remain on for the predetermined period. In the ordinary situation, the user will enter the garage and exit it again before the lights automatically turn off. With known garage door opening systems, the lights of the opening are turned on only as a part of implementing normal door movement commands.

With the prior systems, a person who opens the garage door but waits for whatever reason until after the lights have turned back off to drive out of the garage must do so in the dark. Also, a person who drives up to an open garage door in the dark must drive into the garage in the dark or close, then re-open, the door, to achieve an open door with the lights on. Similarly, a person without a door activating transmitter who approaches an open garage after its lights have turned off, must enter a dark garage. These situations create potential safety hazards and/or inconvenience on the part of the person using the system. A need exists for improved lighting arrangements in combination with garage door openers to eliminate the aforementioned lighting problems with prior garage door opening systems.

SUMMARY OF THE INVENTION

The need is met and a technical advance is achieved in accordance with the invention, in which the lights of the garage door opener are activatable by a person at times when the door is not being moved.

In one embodiment of the invention, the remote actuator (transmitter) of the garage door opener includes a garage door control and a light control. A receiver of the garage door opener responds to first signals transmitted from the remote activator in response to activation of the garage door control by opening and closing the door; both operations including turning the lights for a predetermined period. The receiver of the garage door opener additionally responds to second signals from the remote actuator in response to activating the light control and will turn the lights on without moving the door. Such operation advantageously allows the user to remotely turn the garage lights on from the garage door remote actuator without moving the door. Whenever the user has the garage door remote actuator, he or she can turn the light on or off without operating the garage door opening/closing mechanism.

Modern garage door openers also include a safety arrangement consisting of a light beam directed across the doorway and the opener permits door movement only when no obstructions in the doorway are sensed by the beam. Should the light beam be broken by an obstruction, such as a person, the door will not be permitted to close until the obstruction is removed and the light beam circuit completed. In an embodiment of the present invention, upon sensing that the light beam has been broken, a check is made to determine if the door is stationary and open. If such is the case and the lights are off, the lights of the garage door are turned on. If the door is stationary and open and the lights are on, a momentary turn-off of the lights is enabled. The first situation above turns the lights on whenever a person walks or drives into an open garage in which the lights are off. This provides significant safety advantages. The second situation of momentary blinking of the lights notifies persons in the garage when someone has entered the garage.

BRIEF DESCRIPTION OF THE DRAWINGS

FIG. 6 is a circuit diagram of a wall switch used in the embodiment;

FIG. 8 is a representation of codes transmitted by the rolling code transmitter of FIG. 7;

FIGS. 9A–9C are flow diagrams of the operation of the rolling code transmitter of FIG. 7;

FIG. 11 is a representation of the codes transmitted by the keypad transmitter of FIG. 10;

FIG. 13 is a representation of the codes transmitted by the fixed code transmitter of FIG. 12;

FIG. 14 is a flow diagram of the interrogation of the wall switch of FIG. 6;

FIGS. 18A–18D are flow diagrams of the reception of the code bites comprising full code words;

FIGS. 19A–D are flow diagrams of a learning mode of the system;

FIGS. 20A–C are flow diagrams regarding the interpretation of received codes;

FIGS. 21A–C and 22 are flow diagrams of the interpretation of transmitted codes from keypad type transmitters;

The attached Appendix, consisting of pages A-1 through A-83, is a program listing for a microcontroller used in the disclosed embodiment.

DETAILED DESCRIPTION OF THE PREFERRED EMBODIMENT

Figure 1:
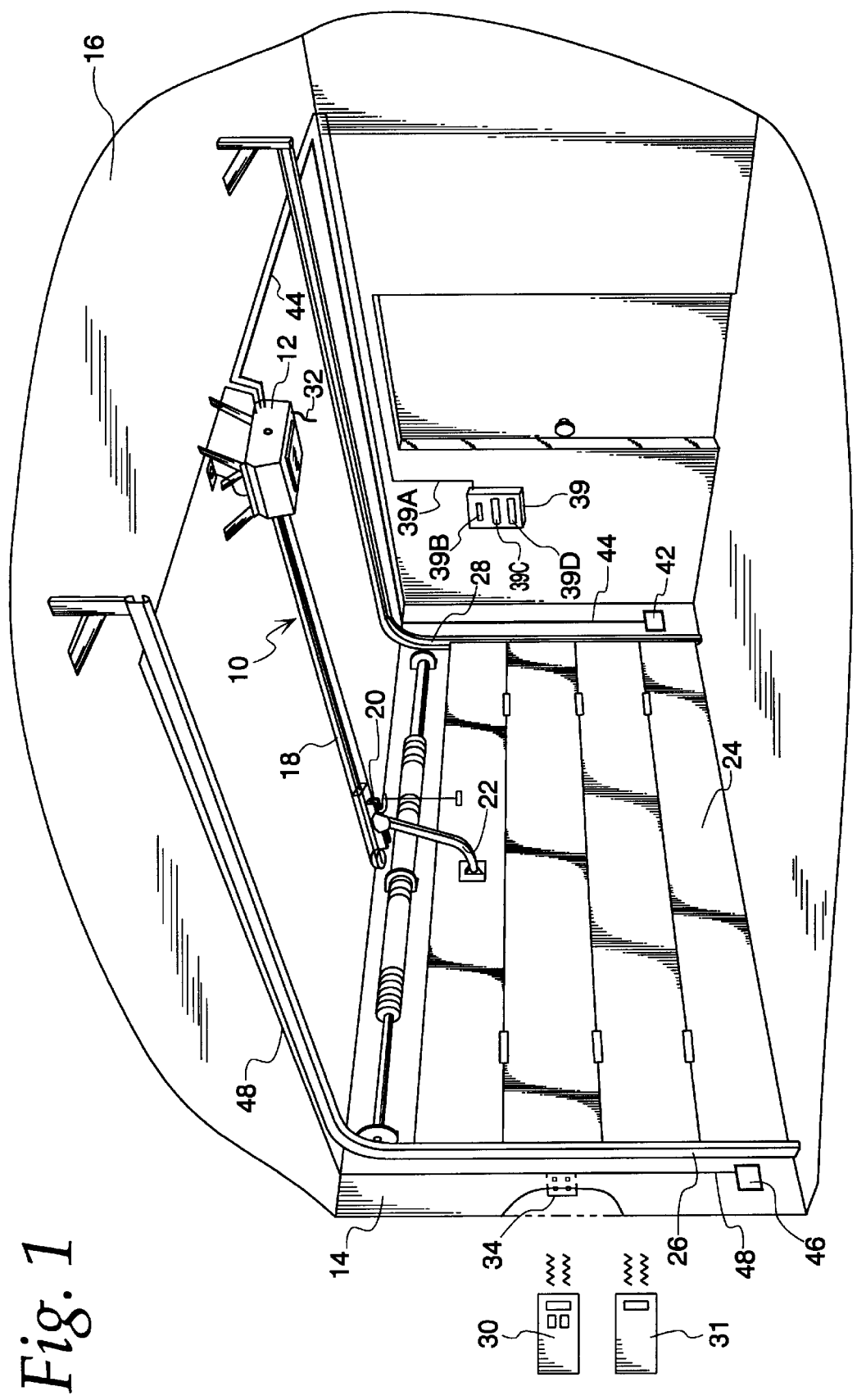
FIG. 1 is a perspective view of a garage having mounted within it a garage door operator embodying the present invention.

Referring now to the drawings and especially to FIG. 1, more specifically a movable barrier door operator or garage door operator is generally shown therein and referred to by numeral 10 includes a head unit 12 mounted within a garage 14. More specifically, the head unit 12 is mounted to the ceiling of the garage 14 and includes a rail 18 extending therefrom with a releasable trolley 20 attached having an arm 22 extending to a multiple paneled garage door 24 positioned for movement along a pair of door rails 26 and 28. The system includes a hand-held transmitter unit 30 adapted to send signals to an antenna 32 positioned on the head unit 12 and coupled to a receiver as will appear hereinafter. An external control pad 34 is positioned on the outside of the garage having a plurality of buttons thereon and communicate via radio frequency transmission with an antenna 32 of the head unit 12. A switch module 39 is mounted on a wall of the garage. The switch module 39 is connected to the head unit by a pair of wires 39a. The switch module 39 includes a light switch 39b, a lock switch 39c and a command switch 39d. An optical emitter 42 is connected via a power and signal line 44 to the head unit. An optical detector 46 is connected via a wire 48 to the head unit 12.

Figure 2:
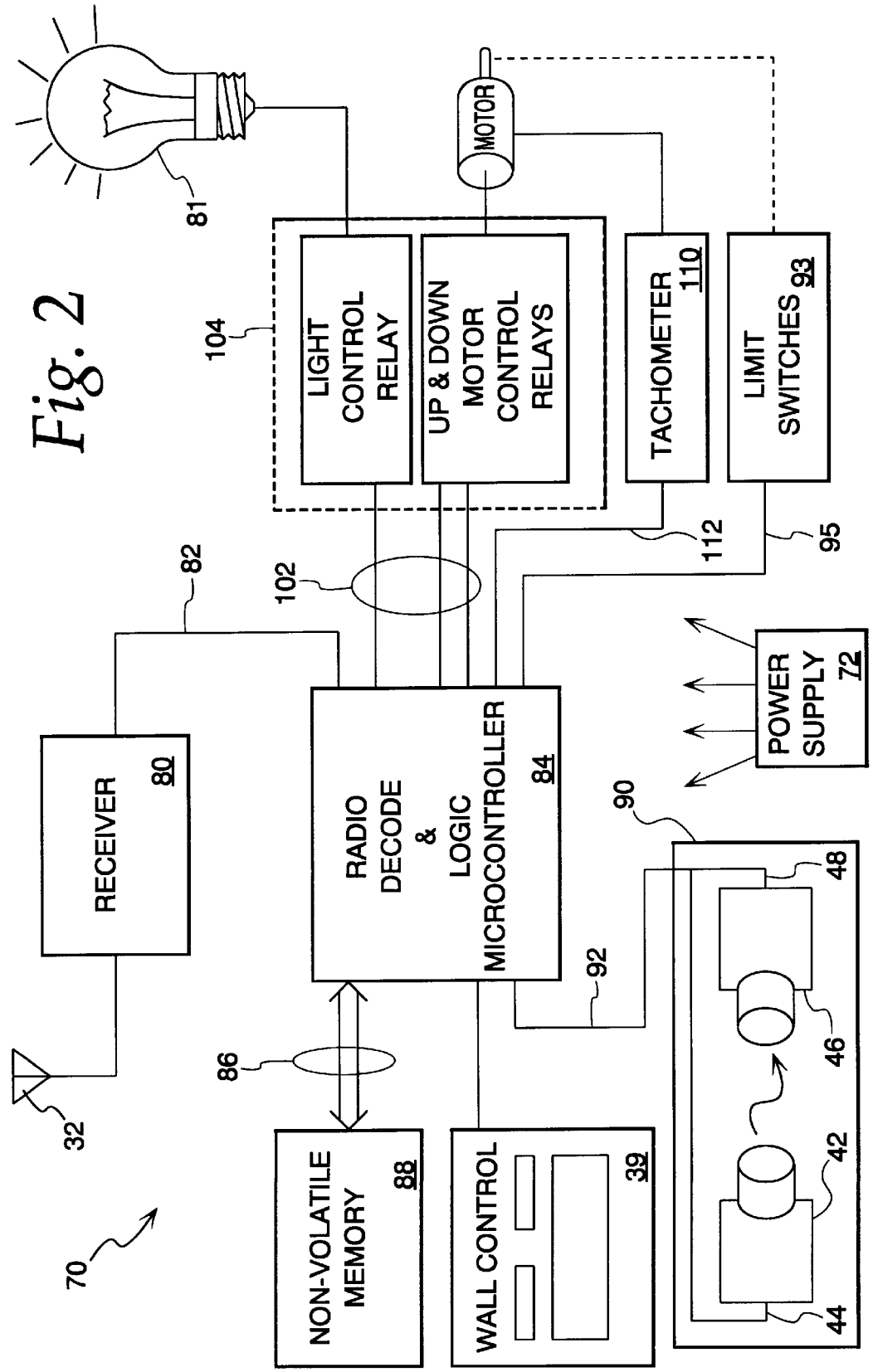
FIG. 2 is a block diagram of a controller mounted within the head unit of the garage door operator employed in the garage door operator shown in FIG. 1.
Figure 3A:
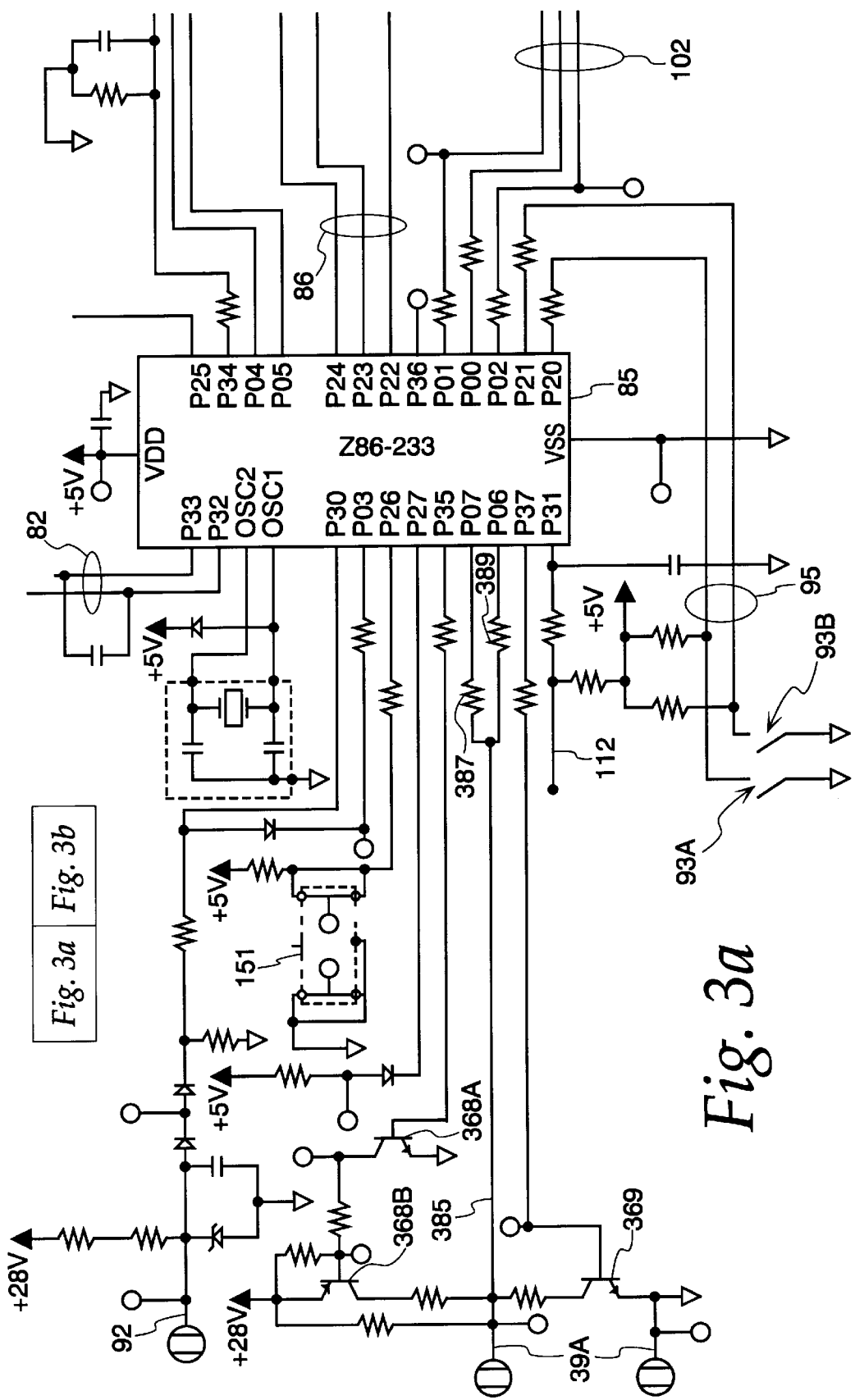
FIG. 3 is a schematic diagram of the controller shown in block format in FIG. 2.

As shown in FIG. 2, the garage door operator 10, which includes the head unit 12 has a controller 70 which includes the antenna 32. The controller 70 includes a power supply 72 (FIG. 4) which receives alternating current from an alternating current source, such as 110 volt AC, and converts the alternating current to required levels of DC voltage. The controller 70 includes a super-regenerative receiver 80 (FIG. 5) coupled via a line 82 to supply demodulated digital signals to a microcontroller 84. The receiver 80 is energized by the power supply 72. The microcontroller is also coupled by a bus 86 to a non-volatile memory 88, which non-volatile memory stores user codes, and other digital data related to the operation of the control unit. An obstacle detector 90, which comprises the emitter 42 and infrared detector 46 is coupled via an obstacle detector bus 92 to the microcontroller. The obstacle detector bus 92 includes lines 44 and 48. The wall switch 39 (FIG. 6) is connected via the connecting wires 39a to the microcontroller 84. The microcontroller 84, in response to switch closures and received codes, will send signals over a relay logic line 102 to a relay logic module 104 connected to an alternating current motor 106 having a power take-off shaft 108 coupled to the transmission 18 of the garage door operator. A tachometer 110 is coupled to the shaft 108 and provides an RPM signal on a tachometer line 112 to the microcontroller 84; the tachometer signal being indicative of the speed of rotation of the motor. The apparatus also includes up limit switches 93a and down limit switches 93b which respectively sense when the door 24 is fully open or fully closed. The limit switches are shown in FIG. 2 as a functional box 93 connected to microcontroller 84 by leads 95.

Figure 4:
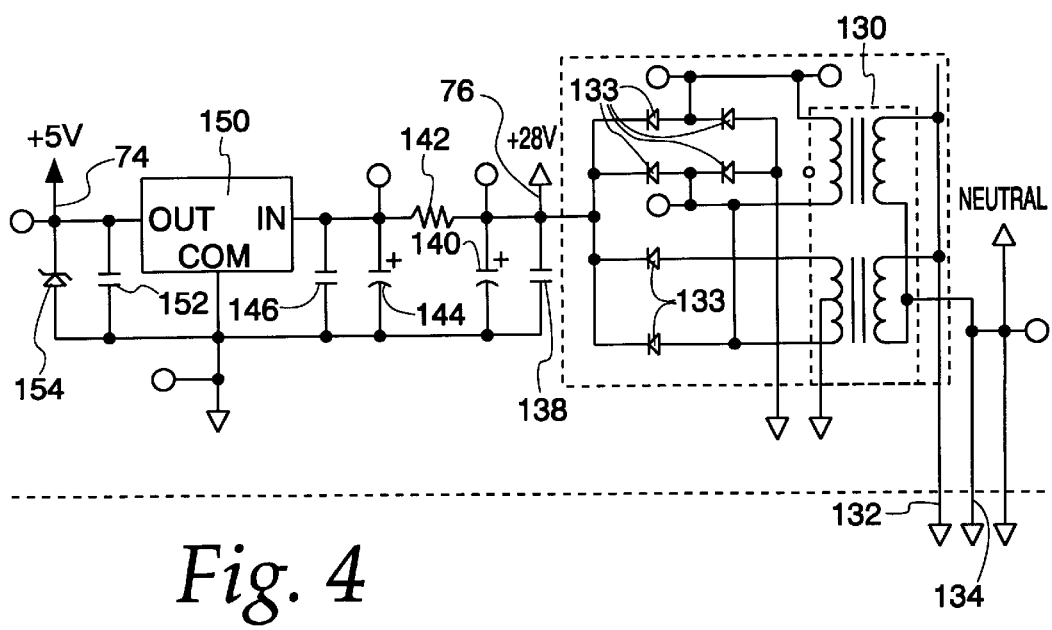
FIG. 4 shows a power supply for use with the apparatus.

FIG. 4 shows the power supply 72 for energizing the DC powered apparatus of FIG. 2. A transformer 130 receives alternating current on leads 132 and 134 from an external source of alternating current. The transformer steps down the voltage to 24 volts and the reduced feeds alternating current is rectified by a plurality of diodes 133. The resulting direct current is connected to a pair of capacitors 138 and 140 which provide a filtering function. A 28 volt filtered DC potential is supplied at a line 76. The DC potential is fed through a resistor 142 across a pair of filter capacitors 144 and 146, which are connected to a 5 volt voltage regulator 150, which supplies regulated 5 volt output voltage across a capacitor 152 and a Zener diode 154 to a line 74.

The controller 70 is capable of receiving and responding to a plurality of types of code transmitters such as the multibutton rolling code transmitter 30, single button fixed code transmitter 31 and keypad type door frame mount transmitter 34 (called keyless).

Figure 7:
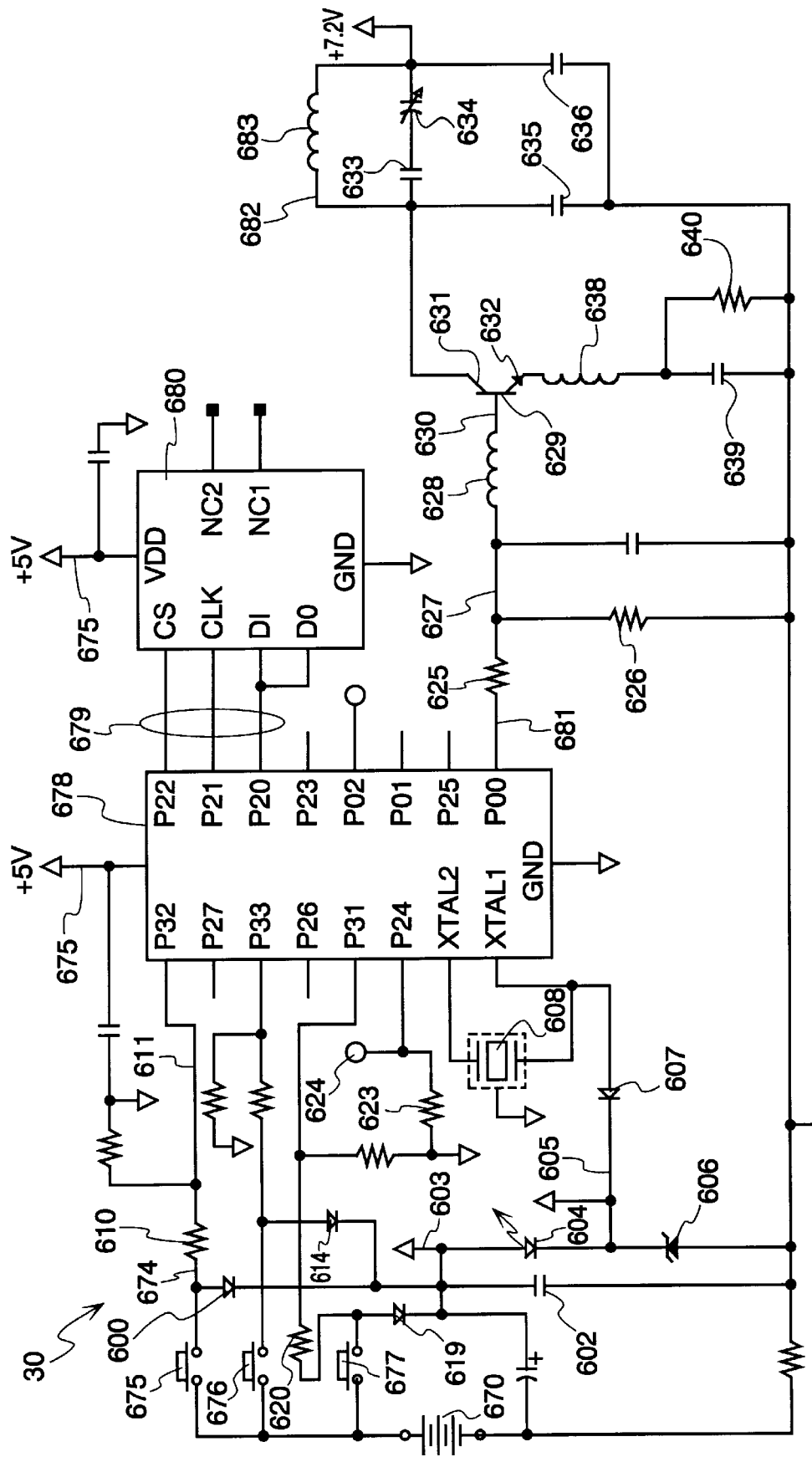
FIG. 7 is a circuit diagram of a rolling code transmitter.

Referring now to FIG. 7, the transmitter 30 is shown therein and includes a battery 670 connected to three pushbutton switches 675, 676 and 677. When one of the pushbutton switches is pressed, a power supply at 674 is enabled which powers the remaining circuitry for the transmission of security codes. The primary control of the transmitter 30 is performed by a microcontroller 678 which is connected by a serial bus 679 to a non-volatile memory 680. An output bus 681 connects the microcontroller to a radio frequency oscillator 682. The microcontroller 678 produces coded signals when a button 675, 676 or 677 is pushed causing the output of the RF oscillator 682 to be amplitude modulated to supply a radio frequency signal at an antenna 683 connected thereto. When switch 675 is closed, power is supplied through a diode 600 to a capacitor 602 to supply a 7.1 volt voltage at a lead 603 connected thereto. A light emitting diode 604 indicates that a transmitter button has been pushed and provides a voltage to a lead 605 connected thereto. The voltage at conductor 605 is applied via a conductor 675 to power microcontroller 678 which is a Zilog 125CO113 8-bit in this embodiment. The signal from switch 675 is also sent via a resistor 610 through a lead 611 to a P32 pin of the microcontroller 678. Likewise, when a switch 676 is closed, current is fed through a diode 614 to the lead 603 also causing the crystal 608 to be energized, powering up the microcontroller at the same time that pin P33 of the microcontroller is pulled up. Similarly, when a switch 677 is closed, power is fed through a diode 619 to the crystal 608 as well as pull up voltage being provided through a resistor 620 to the pin P31.

The microcontroller 678 is coupled via the serial bus 679 to a chip select port, a clock port and a DI port to which and from which serial data may be written and read and to which addresses may be applied. As will be seen hereinafter in the operation of the microcontroller, the microcontroller 678 produces output signals at the lead 681, which are supplied to a resistor 625 which is coupled to a voltage dividing resistor 626 feeding signals to the lead 627. A 30-nanohenry inductor 628 is coupled to an NPN transistor 629 at its base 620. The transistor 629 has a collector 631 and an emitter 632. The collector 631 is connected to the antenna 683 which, in this case, comprises a printed circuit board, loop antenna having an inductance of 25-nanohenries, comprising a portion of the tank circuit with a capacitor 633, a variable capacitor 634 for tuning, a capacitor 635 and a capacitor 636. A 30-nanohenry inductor 638 is coupled via a capacitor 639 to ground. The capacitor has a resistor 640 connected in parallel with it to ground. When the output from lead 681 is driven high by the microcontroller, the capacitor Q1 is switched on causing the tank circuit to output a signal on the antenna 683. When the capacitor is switched off, the output to the drive the tank circuit is extinguished causing the radio frequency signal at the antenna 683 also to be extinguished.

Figures 8, 11, 13:
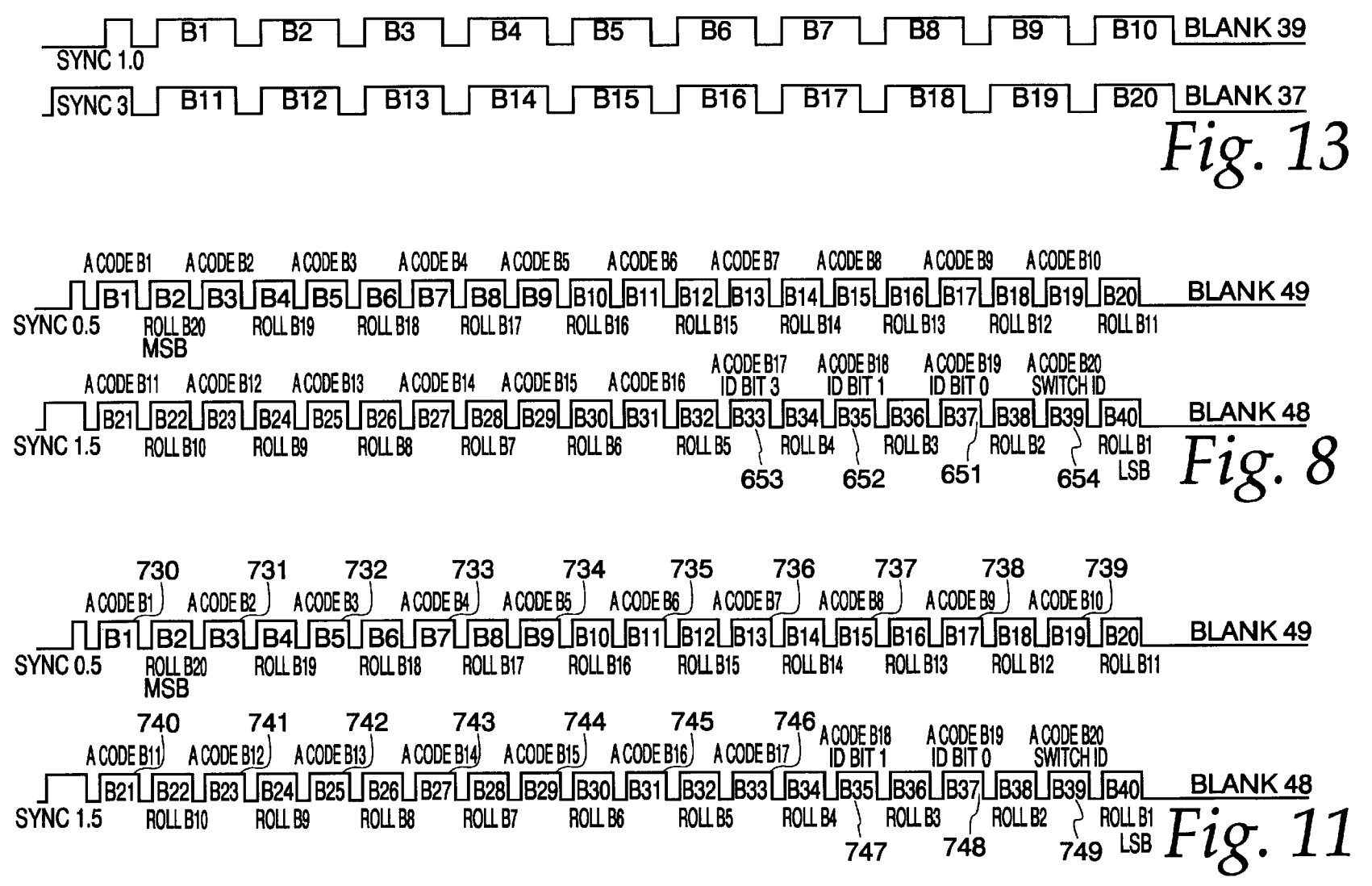

Microcontroller 678 reads a counter value from nonvolatile memory 680 and generates therefrom a 20-bit (trinary) rolling code. The 20-bit rolling code is interleaved with a 20-bit fixed code stored in the nonvolatile memory 680 to form a 40-bit (trinary) code as shown in FIG. 8. The "fixed" code portion includes 3 bits 651, 652 and 653 (FIG. 8) which identify the type of transmitter sending the code and a function bit 654. Since bit 654 is a trinary bit, it is used to identify which of the three switches, 675, 676 or 677 was pushed.

Figure 9A:
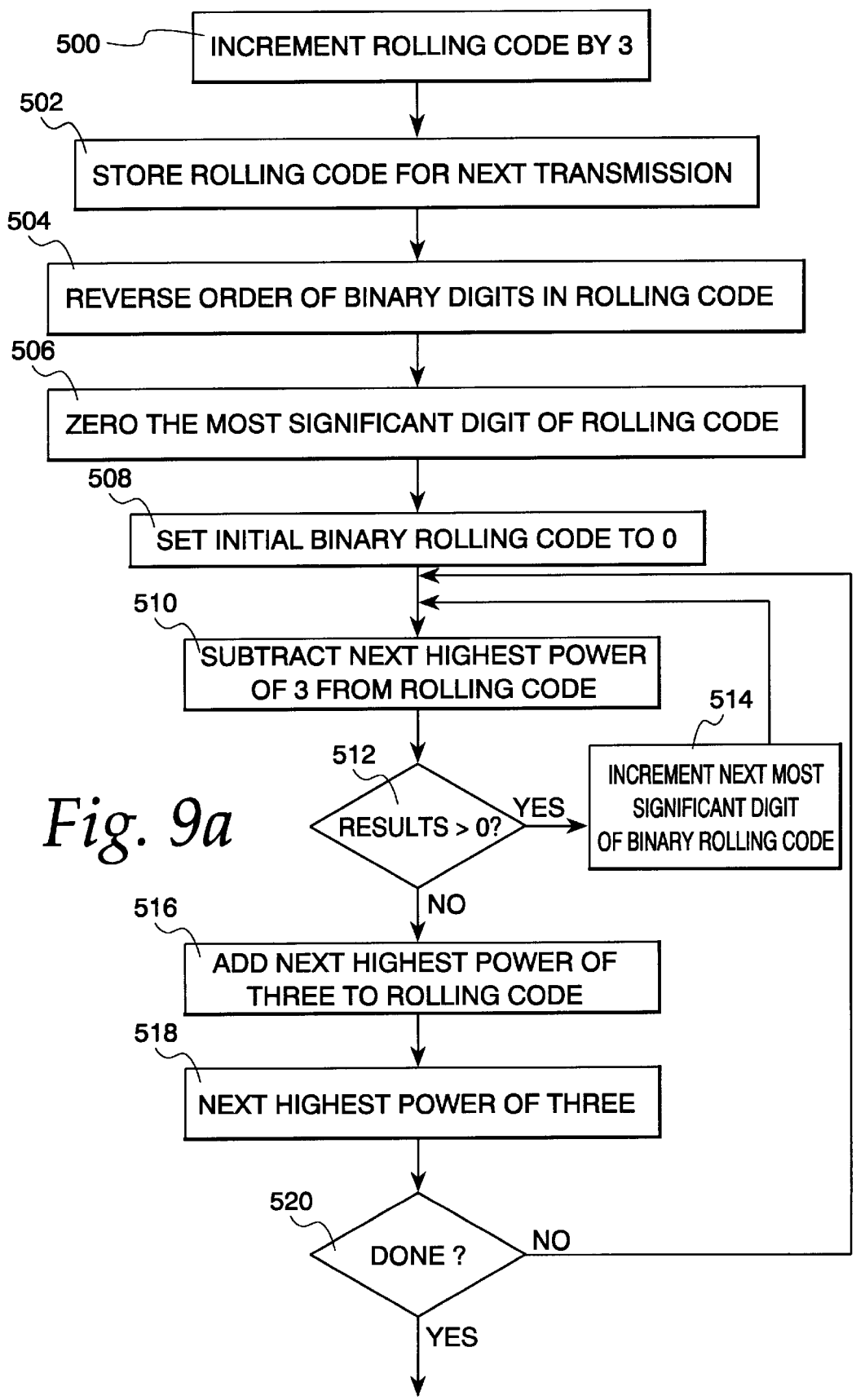
Figure 9B:
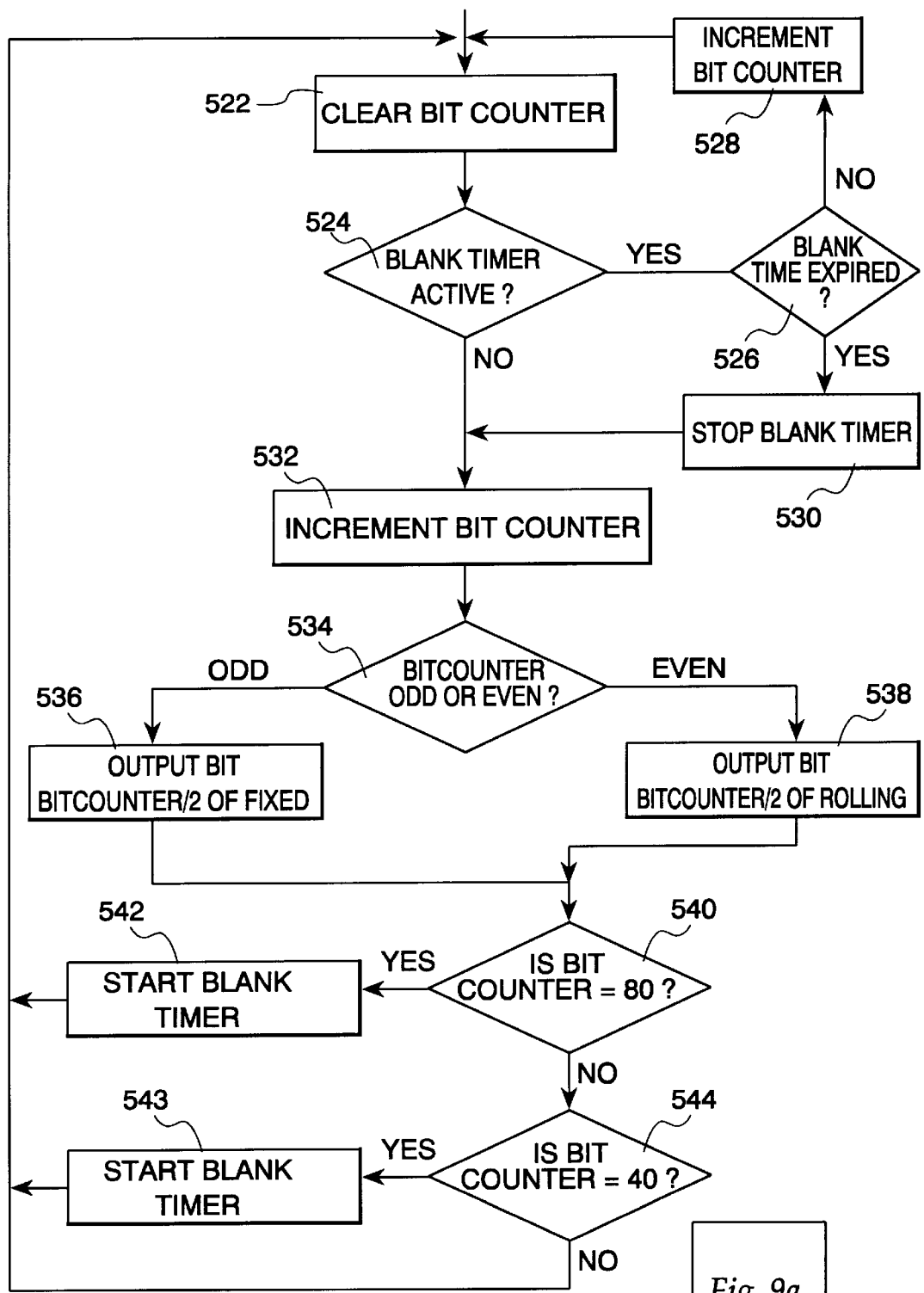

Referring now to FIGS. 9A through 9C, the flow chart set forth therein describes the operation of the transmitter 30. A rolling code from nonvolatile memory is incremented by three in a step 500, followed by the rolling code being stored for the next transmission from the transmitter when a transmitter button is pushed. The order of the binary digits in the rolling code is inverted or mirrored in a step 504, following which in a step 506, the most significant digit is converted to zero effectively truncating the binary rolling code. The rolling code is then changed to a trinary code having values 0, 1 and 2 and the initial trinary rolling code is set to 0. It may be appreciated that it is trinary code which is actually used to modify the radio frequency oscillator signal and the trinary code is best seen in FIG. 8. It may be noted that the bit timing in FIG. 8 for a 0 is 1.5 milliseconds down time and 0.5 millisecond up time, for a 1, 1 millisecond down and 1 millisecond up and for a 2, 0.5 millisecond down and 1.5 milliseconds up. The up time is actually the active time when carrier is being generated. The down time is inactive when the carrier is cut off. The codes are assembled in two frames, each of 20 trinary bits, with the first frame being identified by a 0.5 millisecond sync bit and the second frame being identified by a 1.5 millisecond sync bit.

In a step 510, the next highest power of 3 is subtracted from the rolling code and a test is made in a step 512 to determine if the result is equal to zero. If it is, the next most significant digit of the binary rolling code is incremented in a step 514, following which flow is returned to the step 510. If the result is not greater than 0, the next highest power of 3 is added to the rolling code in the step 516. In the step 518, another highest power of 3 is incremented and in a step 520, a test is determined as to whether the rolling code is completed. If it is not, control is transferred back to step 510. If it has, control is transferred to step 522 to clear the bit counter. In a step 524, the blank timer is tested to determine whether it is active or not. If it is not, a test is made in a step 526 to determine whether the blank time has expired. If the blank time has not expired, control is transferred to a step 528 in which the bit counter is incremented, following which control is transferred back to the decision step 524. If the blank time has expired as measured in decision step 526, the blank timer is stopped in a step 530 and the bit counter is incremented in a step 532. The bit counter is then tested for odd or even in a step 534. If the bit counter is not even, control is transferred to a step 536 where the bit of the fixed code bit counter divided by 2 is output. If the bit counter is even, the rolling code bit counter divided by 2 is output in a step 538. By the operation of 534, 536 and 538, the rolling code bits and fixed code bits are alternately transmitted. The bit counter is tested to determine whether it is set to equal to 80 in a step 540. If it is, the blank timer is started in a step 542. If it is not, the bit counter is tested for whether it is equal to 40 in a step 544. If it is, the blank timer is tested and is started in a step 544. If the bit counter is not equal to 40, control is transferred back to step 522.

Figure 10:
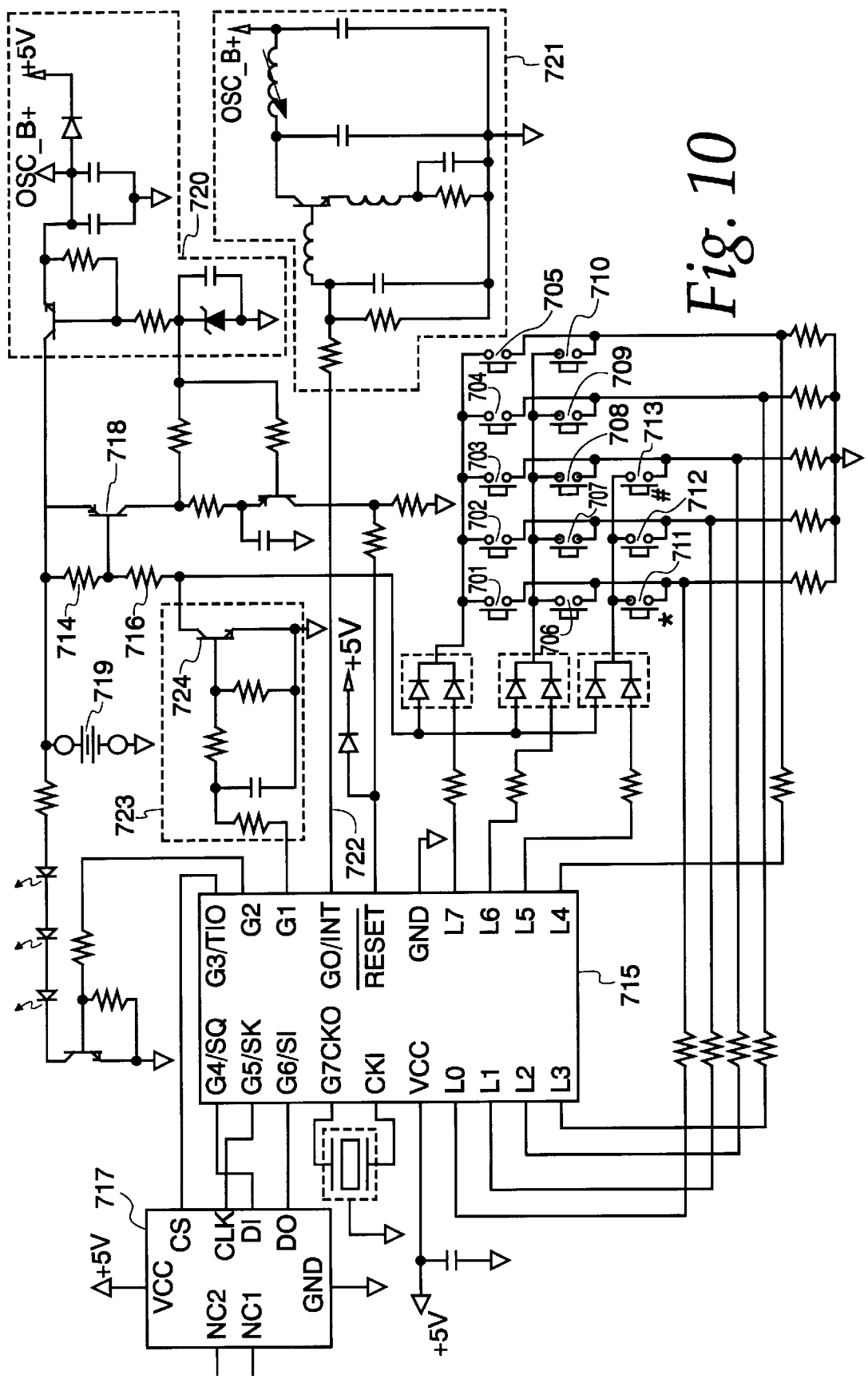
FIG. 10 is a circuit diagram of a keypad transmitter.

FIG. 10 shows a keypad type rolling code transmitter 34 which is sometimes referred to as a keyless transmitter because it replaces an old style entry in which a physical key was used. Transmitter 34 includes a microprocessor 715 and non-volatile memory 717 powered by a switched battery 719. Also included are 13 keys 710–713 connected in row and column format. The battery 719 is not normally supplying power to the transmitter. When a button, e.g. 701, is pressed, current flows through series connected resistors 714 and 716 and through the pressed switch to ground. Voltage division by resistors 714 and 716 causes the power supply 720 to be switched on, supplying power from battery 719 to microprocessor 715, memory 717 and an RF transmitter stage 721. Initially, microprocessor 715 enables a power on circuit 723 to cause a transistor 724 to conduct, thereby keeping the power supply 720 active. Microprocessor 715 includes a timer which disables power on circuit 723 a predetermined period of time, e.g. 10 seconds, after the last key 701–713 is pressed, to preserve battery life.

The row and column conductors are repeatedly sensed at input terminals LO–L7 of the microprocessor 715 so that microprocessor 715 can read each key pressed and store a representation thereof. A human operator presses a number of, for example, four keys followed by pressing the enter key 712, the * key 711 or the # key 713. When one of the keys 711–713 is pressed, microprocessor 715 generates a 40-bit (trinary) code which is sent via conductors 722 to transmitter stage 721 for transmission. The code is formed by microprocessor 715 from a fixed code portion and a rolling code portion in the manner previously described with regard to transmitter 30. The fixed code portion comprises, however, a serial number associated with the transmitter 34 and a key press portion identifying the four keys pressed and which of the three keys 711–713 initiated the transmission. FIG. 11 represents the code transmitted by keypad transmitter 34. As with prior rolling code transmission, the code consists of alternating fixed and rolling code bits (trinary). Bits 730–749 are the fixed code bits. Bits 730–739 represent the keys pressed and bits 740–748 represent the serial number of the unit in which bits 746–748 represent the type of transmitter. In some transmitters 34 no * and # keys are present. In this situation the * and # keys are respectively simulated by simultaneously pressing the 9 key and enter key or the 0 key and enter key.

Figure 12:
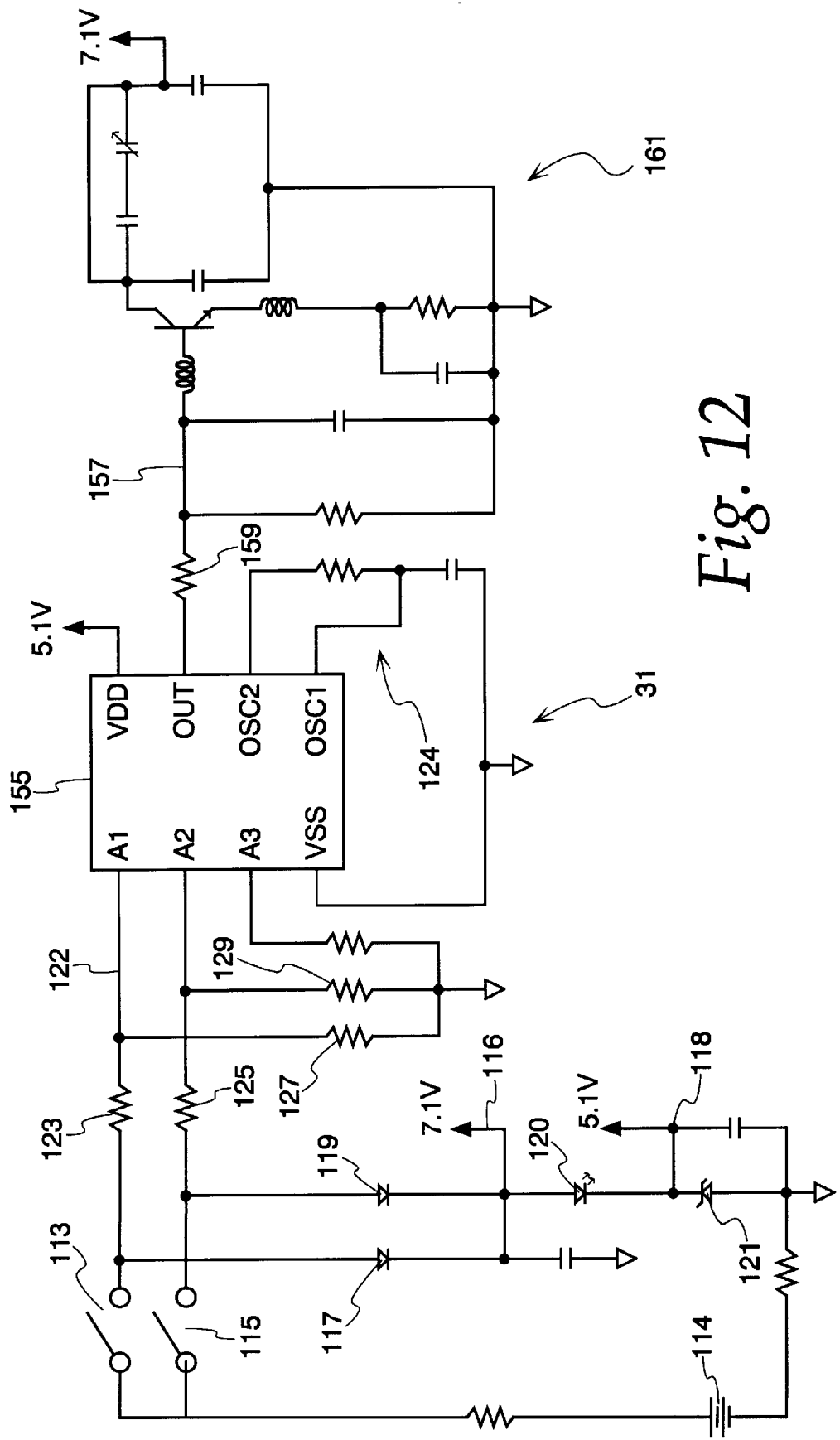
FIG. 12 is a circuit diagram of a fixed code transmitter.

FIG. 12 is a circuit description of a fixed code transmitter 31 which includes a controller 155, a pair of switches 113 and 115, a battery 114 and an RF transmitter stage 161 of the type discussed above. Controller 155 is a relatively simple device and may be a combination logic circuit. Controller 155 permanently stores 19 bits (trinary) of the 20 bit fixed code (FIG. 13) to be transmitted. When a switch, e.g., 113, is pressed, current from the battery 114 is applied via the switch 113 and a diode 117 to a 7.1 volt source 116 which powers RF transmitter stage 161. The 7.1 volt source is also connected to ground via a LED 120 and Zener diode 121 which produces a regulated 5.1 volt source 118. The 5.1 volt source is connected to power the controller 155.

Closing switch 113 also applies battery voltage to series connected resistors 123 and 127 so that upon switch 113 closing, a voltage on a conductor 122 rises from substantially ground to an amount representing a logic "1". Upon power up, controller 155 reads the logic 1 on conductor 122 and generates a 20 bit (trinary) code from the permanently stored 19 bits integral to the controller and the state of the switch 113. Controller 155 then transmits the 20 bit code to the RF stage 161 via a resistor 159 and conductor 157. The code is thus transmitted to receiver 80. Controller 155 includes an internal oscillator regulated by an RC circuit 124 to control the timing of controller operations.

FIG. 13 represents the code transmitted from a fixed code transmitter such as transmitter 30. The code comprises 20 bits in two 10 bit words with a blank period between the words. Each word is preceded by a sync bit which allows receiver synchronization and which identifies the type of code being sent. The sync bit for the first code word is active for approximately 1.0 milliseconds and the sync bit of the second word is active for approximate 3 milliseconds.

The wall switch 39 is shown in detail in FIG. 6 along with a portion of microcontroller 85 and the interrogate/sense circuitry interconnecting the two. Wall switch 39 comprises three switches 39b–39d. Switch 39d is the command switch which is connected directly between the conductors 39a. Switch 39b, the light switch, is connected between the conductors 39a via a 1 microfarad capacitor 386. Switch 39c, the vacation or lock switch, is connected between conductors 39a by a 22 microfarad capacitor 384. Wall switch 39 also includes a resistor 380 and diode 392 serially connected between conductors 39a. Microcontroller 85 interrogates the wall switch 39 approximately once every 10 milliseconds to determine whether a button 39b–d is being pressed. FIG. 14 is a flow diagram of the interrogation. At the beginning (step 802, FIG. 14) of each test, microcontroller 85 turns on transistor 368b by a signal applied from pin P35 to the base of transistor 368a and at the same time turns a transistor 369 off from pin P37. Pins P07 and P06 are connected to read the voltage level between conductors 39a by a conductor 385 and respective resistors 387 and 389. If pins P07 and P06 are low (step 804) the command switch 39d is closed (step 806) and a status bit is marked in RAM (step 830) to indicate such. Alternatively, if pins P07 and P06 are high, further tests (step 803) must be performed. First, micro-controller 85 turns transistor 368b off and transistor 369 on. Then, after a short pause (step 810) to allow stray capacitance to discharge, pins P07 and P06 are again sensed (step 812). If P07 and P06 are low, no switches have been closed (step 814) and their status in RAM is so set (step 830). However, if after the short pause the level of conductor 385 is high, microcontroller 85 waits approximately 2 milliseconds (step 816) and again tests (step 818) the voltage level of conductor 385. If the voltage is now low, the light switch 396 has been closed (step 820). This assessment can be made since 2 milliseconds is adequate time for the 1 microfarad capacitor 386 to discharge. If the input at pins P07 and P06 is still high at the 2 millisecond test, the controller retests (step 824) after an additional 16 millisecond delay (step 822). If the pins P07 and P06 are low after the 16 millisecond delay, the vacation switch 39c was closed (step 826) and, alternatively, if the voltage at pins P07 and P06 is high, no switches were closed (step 828). At the completion of the wall switch test the status bits of the three switches 39b, 39c and 39d are set to reflect their identified state (step 830).

Figure 5:
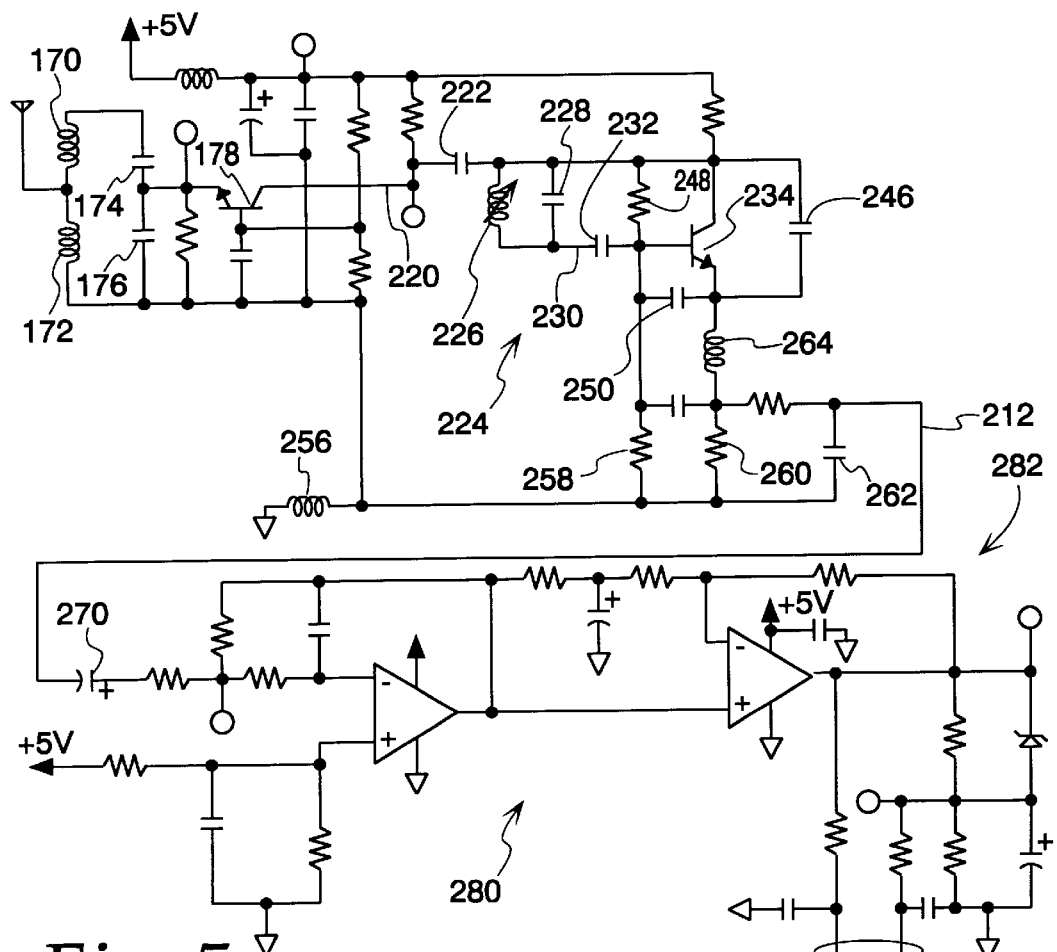
FIG. 5 is a detailed circuit description of the radio receiver used in the apparatus.

The receiver 80 is shown in detail in FIG. 5. RF signals may be received by the controller 70 at the antenna 32 and fed to the receiver 80. The receiver 80 includes a pair of inductors 170 and 172 and a pair of capacitors 174 and 176 that provide impedance matching between the antenna 32 and other portions of the receiver. An NPN transistor 178 is connected in common base configuration as a buffer amplifier. The RF output signal is supplied on a line 200, coupled between the collector of the transistor 178 and a coupling capacitor 220. The buffered radio frequency signal is fed via the coupling capacitor 222 to a tuned circuit 224 comprising a variable inductor 226 connected in parallel with a capacitor 228. Signals from the tuned circuit 224 are fed on a line 230 to a coupling capacitor 232 which is connected to an NPN transistor 234 at its base. The collector 240 of transistor 234 is connected to a feedback capacitor 246 and a feedback resistor 248. The emitter is also coupled to the feedback capacitor 246 and to a capacitor 250. A choke inductor 256 provides ground potential to a pair of resistors 258 and 260 as well as a capacitor 262. The resistor 258 is connected to the base of the transistor 234. The resistor 260 is connected via an inductor 264 to the emitter of the transistor 234. The output signal from the transistor is fed outward on a line 212 to an electrolytic capacitor 270.

As shown in FIG. 5, the capacitor 270 couples the demodulated radio frequency signal from transistor 234 to a bandpass amplifier 280 to an average detector 282. An output of the bandpass amplifier 280 is coupled to pin P32 of a Z86233 microcontroller 85. Similarly, an output of average detector 282 is connected to pin P33 of the microcontroller. The microcontroller is energized by the power supply 72 and also controlled by the wall switch 39 coupled to the microcontroller by the lead 39a.

Pin P26 of microcontroller 85 is connected to a grounding program switch 151 which is located at the head end unit 12. Microcontroller 85 periodically reads switch 151 to determine whether it has been pressed. As discussed later herein, switch 151 is normally pressed by an operator who wants to enter a learn or programming mode to add a new transmitter to the accepted transmitters last stored in the receiver. When the operator continuously presses switch 151 for 6 seconds or more, all memory settings are overwritten and a complete relearning of transmitter codes and the type of codes to be received is then needed. Pressing switch 151 for a momentary time after a 6+ second press enters the apparatus into a mode for learning a new transmitter type which can be either rolling code type or fixed code type.

Pins P30 and P03 of microcontroller 85 are connected to obstacle detector 90 via conductor 92. Obstacle detector 90 transmits a pulse on conductor 92 every 10 milliseconds when the infrared beam between sender 42 and receiver has not been broken by an obstacle. When the infrared beam is blocked, one or more pulses will be skipped by the obstacle detector 46. Microcontroller 85 scans the signal on conductor 92 every 1 millisecond to determine if a pulse has been received in the last 12 milliseconds. When a pulse has not been received, an obstacle is assumed and appropriate action, as discussed below, may be taken.

Microcontroller pin P31 is connected to tachometer 110 via conductor 112. When motor 106 is turning, pulses having a time separation proportional to motor speed are sent on conductor 112. The pulses on conductor 112 are repeatedly scanned by microcontroller 85 to identify if the motor 106 is rotating and, if so, how fast the rotation is occurring.

The apparatus includes an up limit switch 93a and a down limit switch 93b which detect the maximum upward travel of door 24 and the maximum downward travel of the door. The limit switches 93a and 93b may be connected to the garage structure and physically detect the door travel or, as in the present embodiment, they may be connected to a mechanical linkage inside head end 12, which arrangement moves a cog (not shown) in proportion to the actual door movement and the limit switches detect the position of the moved cog. The limit switches are normally open. When the door is at the maximum upward travel, up limit switch 93*a* is closed, which closure is sensed at port P20 of microcontroller 85. When the door is at its maximum down position, down limit switch 93*b* will close, which closure is sensed at port P21 of the microcontroller.

The microcontroller 85 responds to signals received from the wall switch 39, the transmitters 30 and 34, the up and down limit switches, the obstruction detector and the RPM signal to control the motor 106 and the light 81 by means of the light and motor control relays 104. The on or off state of light 81 is controlled by a relay 105*b*, which is energized by pin P01 of microcontroller 85 and a driver transistor 105*a*. The motor 106 up windings are energized by a relay 107*b* which responds to pin P00 of microcontroller 85 via driver transistor 107*a* and the down windings are energized by relay 109*b* which responds to pin P02 of microcontroller 85 via a driver transistor 109*a*.

Each of the pins P00, P01 and P02 is associated with a memory mapped bit, such as a flip/flop, which can be written and read. The light can thus be turned on by writing a logical "1" in the bit associated with pin P01 which will drive transistor 105*a* on energizing relay 105*b*, causing the lights to light via the contacts of relay 105*b* connecting a hot AC input 135 to the light output 136. The status of the light 81 can be determined by reading the bit associated with pin P01. Similar actions with regard to pins P00 and P02 are used to control the up and down rotation of motor 106. It should be mentioned, however, that energizing the light relay 105*b* provides hot AC to the up and down motor relays 107*b* and 109*b* so the light should be enabled each time a door movement is desired.

The radio decode and logic microcontroller 84 (FIG. 2) of the present embodiment can respond to both rolling codes as shown in FIG. 8 and fixed codes as shown in FIG. 13; however, after it has learned one type of code all permissible codes will be of the same type until the system memory is erased and the other type of code is entered and exclusively responded to. When the apparatus is first powered up or after memory control values have been erased in response to a greater than 6 second press of program button 151, the system does not know whether it will be trained to respond to fixed or rolling codes. Accordingly, the system enters a test mode to enable it to receive both types of access codes and determine which type of code is being received. In the test mode the apparatus periodically resets itself to receive one of rolling codes or alternatively, fixed codes, until a code of the expected type is received. A short press of switch 151 after the 6+ second press causes a learn mode to be entered. When a code is correctly received in the test mode, and the apparatus is in a learn mode, the type of expected code becomes the code type to be received and the received fixed code or fixed code portion of a received rolling code is stored in nonvolatile memory for use in matching later received codes. In the case of a received rolling code, the rolling code portion is also stored in association with the stored fixed code portion to be used in matching subsequently received rolling codes. After a rolling code has been learned by the system, only additional rolling codes can be learned until a reprogramming occurs. Similarly, after a fixed code is learned, only additional fixed codes can be received and learned until reprogramming occurs.

Figure 15:
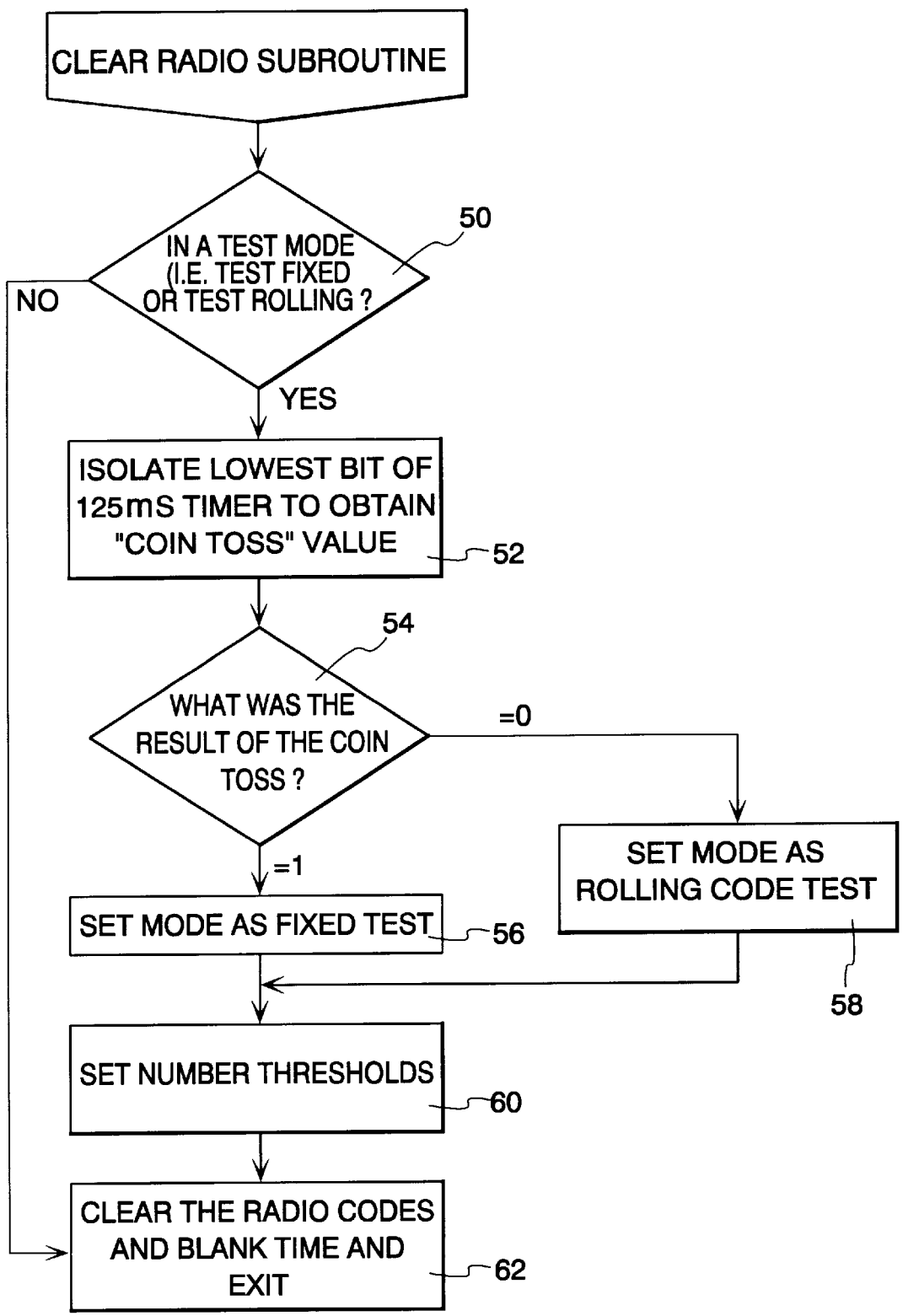
FIG. 15 is a flow diagram of a clear radio subroutine performed by a controller of the embodiment.

From time to time while receiving incoming codes, it is determined that a code being received is not proper and a clear radio subroutine (FIG. 15) is called by microcontroller 85. A decision step 50 is first performed to determine whether the apparatus is in a test mode or a regular mode. When not in a test mode, flow proceeds to a step 62 to clear radio codes and blank timer after which the subroutine is exited. When decision step 50 identifies the test mode, steps 52–60 are performed to arbitrarily select the fixed code or rolling code mode and set up necessary values to seek the selected mode. In step 52 the lowest bit of a continuous timer is selected as a randomizer. The value of the lowest bit is then analyzed in a decision step 54. When the lowest bit is a "1" the fixed test mode is selected in step 56 and the numeric thresholds needed for receiving fixed codes are stored in a step 60 before clearing the radio codes and exiting in step 62. When decision step 54 determines that the lowest bit is a "0", the rolling code mode is selected in step 58 followed by the storage of rolling code numeric threshold values in step 60. Flow proceeds to step 62 when radio codes are cleared and the clear radio subroutine is exited.

Figure 16:
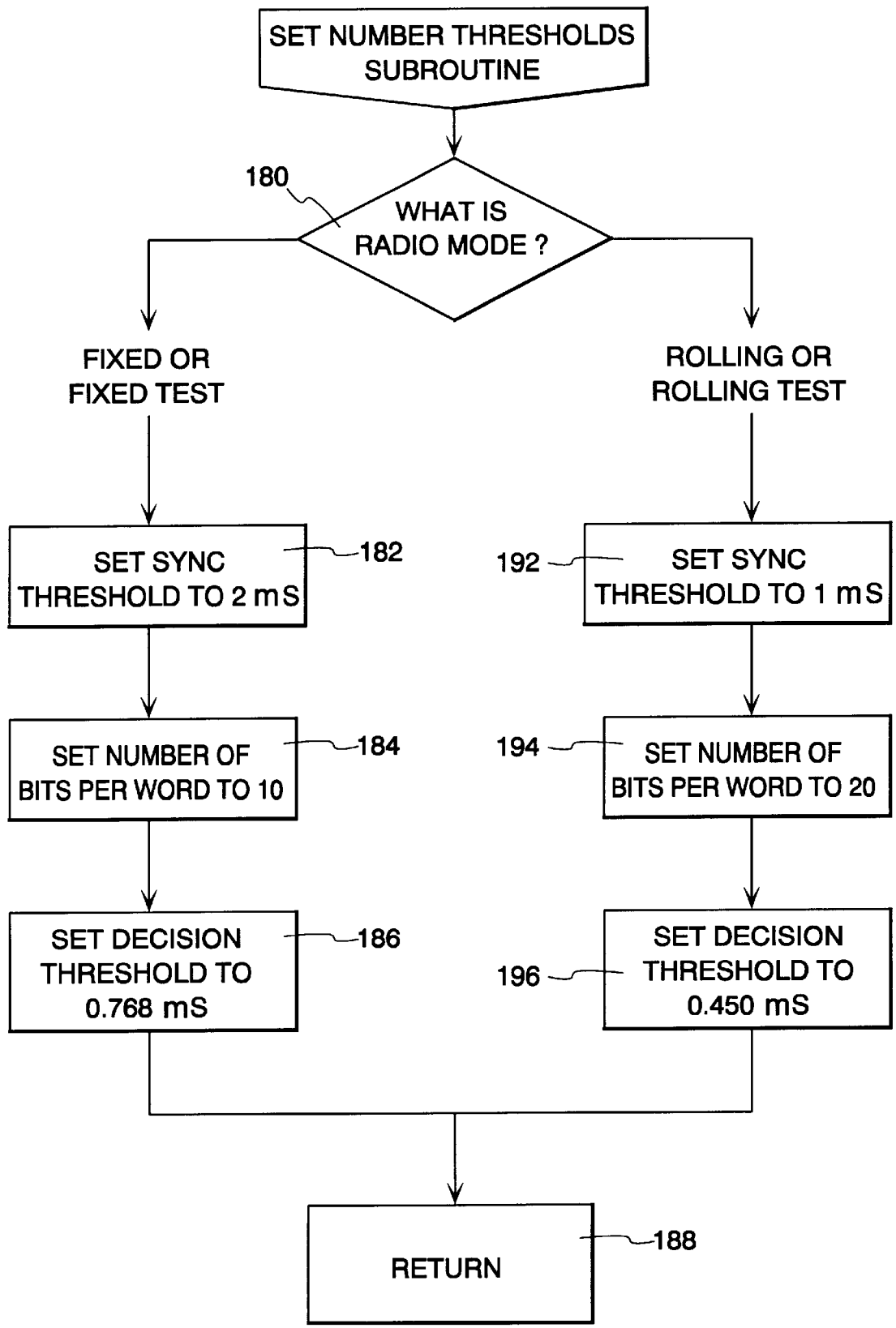
FIG. 16 is a flow diagram of a set number thresholds subroutine.

The set number thresholds subroutine (step 60 of FIG. 15) is shown in more detail in FIG. 16. Initially, a step 180 is performed to identify which mode is presently selected. When the mode is determined to be a fixed code mode, steps 182, 184 and 186 are next performed to set the sync threshold to 2 milliseconds, the number of bits per word to 10 and the decision threshold to 0.768 milliseconds. Alternatively, when step 180 determines that the rolling code mode is selected, steps 192, 194 and 196 are performed to set the sync threshold to 1 millisecond, the number of bits per word to 20 and the decision threshold to 0.450 milliseconds. After the performance of either step 186 or 196 the subroutine returns in step 188.

Figure 17:
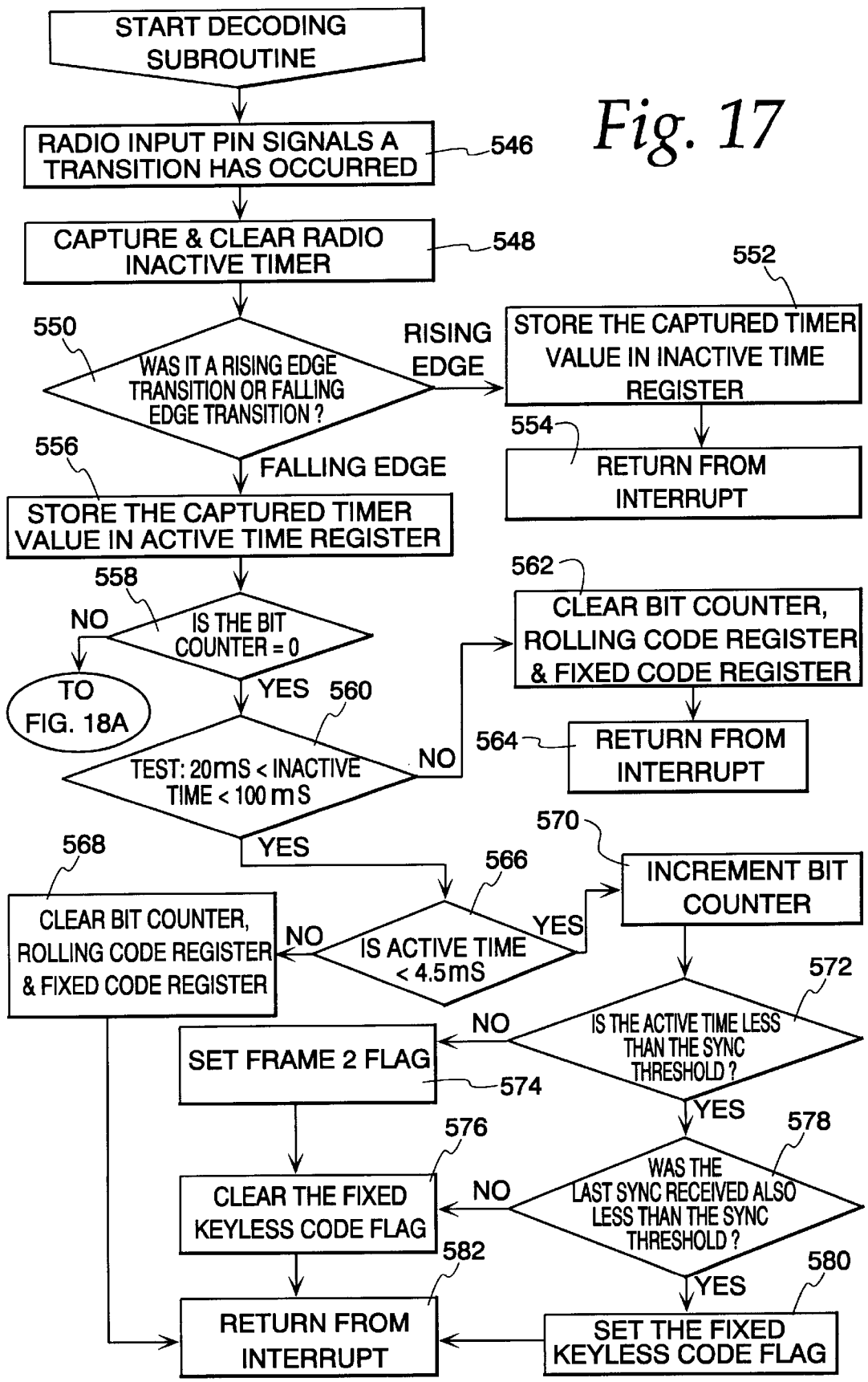
FIGS. 17A and 17B are flow diagrams of the beginning of radio code reception by the controller.

The primary received code analysis routine performed by microcontroller 85 begins at FIG. 17A in response to an interrupt generated by a rising or falling edge being received from the receiver 80 at pins P32 and P33. Given the pulse width format of coded signals, the microcontroller maintains active or inactive timers to measure the duration between rising and falling edges of the detected radio signal. Initially, a step 546 is performed when a transition of radio signal is detected and a step 548 follows to capture the inactive timer and perform the clear radio routine. Next, a determination is made in step 550 of whether the transition was a rising or falling edge. When a rising edge is detected, step 552 is next performed in which the captured timer is stored followed by a return in step 554. When a falling edge is detected in step 550, the timer value captured in step 548 is stored (step 556) in the active timer. A decision step 558 is next performed to determine if this is the first portion of a new word. When the bit counter equals "0" this is a first portion in which a sync pulse is expected and the flow proceeds to step 560 (FIG. 17B).

In step 560, the inactive timer value is measured to see if it exceeds 20 milliseconds but is less than 100 milliseconds. When the inactive timer is not in the range, step 562 is performed to clear the bit counter, the rolling code register and the fixed code register. Subsequently, a return is performed. When the inactive timer is within the range of step 560, step 566 is performed to determine if the active timer is less than 4.5 milliseconds. When the active timer is too large, the values are cleared in step 568 followed by a return in step 582.

When the active timer is found to be less than 4.5 milliseconds in step 566, a sync pulse has been found, the bit counter is incremented in step 570 and a decision step 572 is performed. In decision step 572, the active timer is compared with the sync threshold established in the set number thresholds subroutine of FIG. 16. Accordingly, decision step 572 uses a value of 2 milliseconds when a fixed code is expected and a value of 1 millisecond when a rolling code is expected. When step 572 determines that the active timer exceeds the threshold, a frame 2 flag is set in step 574 and a fixed keyless code flag is cleared in step 576. Thereafter, a return is performed in step 582. When the active timer is found in step 572 to be less than the sync threshold, a decision step 578 is performed to determine if two successive sync pulses have been of the same length. If not, the keyless code flag is cleared in step 576 and a return is performed in step 582. Alternatively, when two equal successive sync pulses are detected in step 578, the fixed keyless code flag is set in step 580 and a return is implemented in step 582.

Figure 18B:
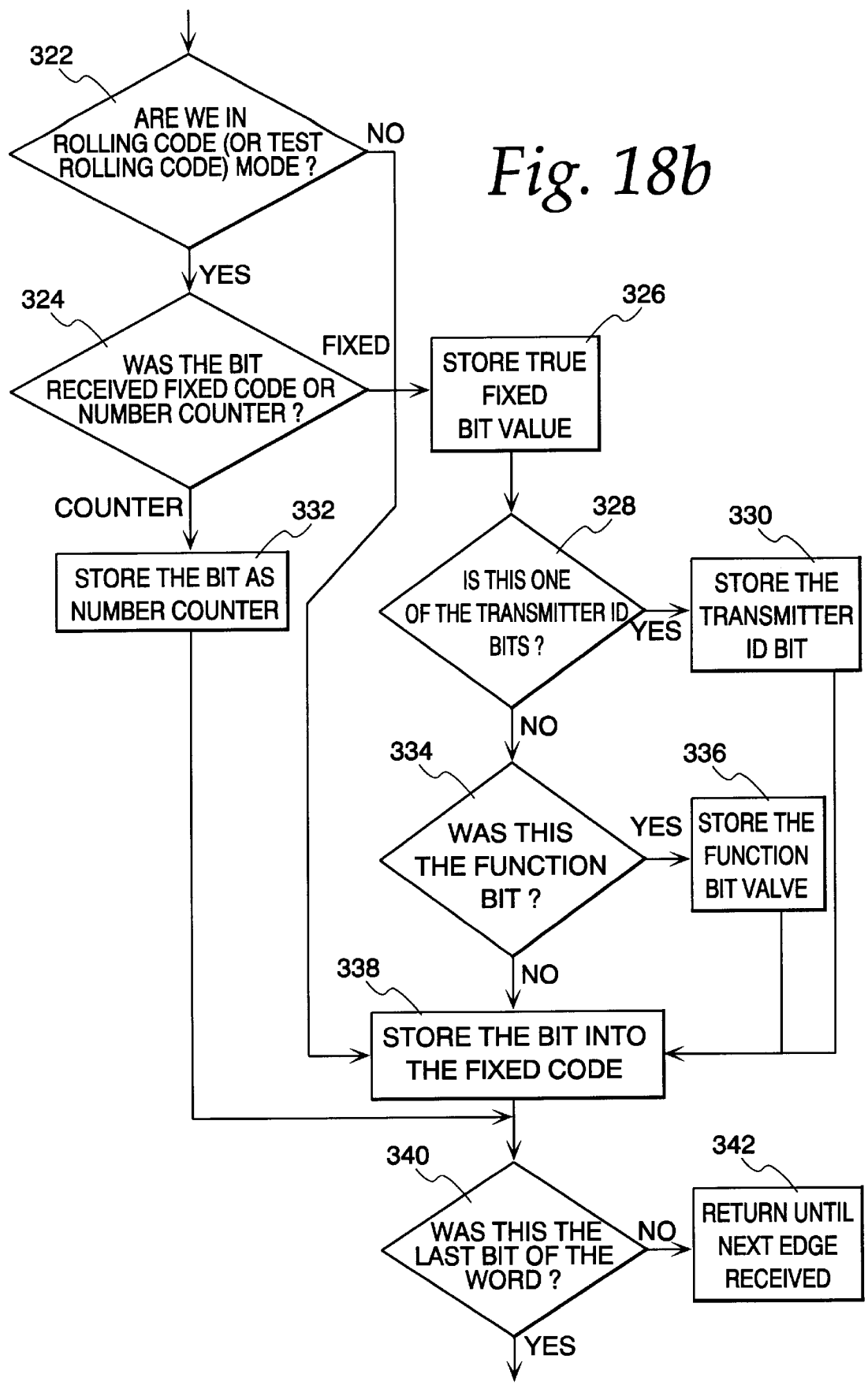

When the performance of step 558 identifies that the bit count is not "0", indicating a non-sync bit, the flow proceeds to step 302 (FIG. 18A). In the sequence of steps shown in FIGS. 18A–18D, microcontroller 85 identifies the individual code bits of a received code word. In step 302 the length of the active period is compared with 5.16 milliseconds and when the active period is not less, the registers and counters are cleared and a return is performed. When step 302 indicates that the active period was less than 5.16 milliseconds, a step 306 is performed to determine if the inactive period is less than 5.16 milliseconds. If it is less, the step 304 is performed to clear values and return. Alternatively, when step 306 is answered in the affirmative a bit has been received and the bit counter is incremented in a step 308. In the subsequent step 310 the value of the active and inactive timers are subtracted and the result is compared in step 312 with the complement of the decision threshold for the type of code expected. When the result is less than the complement of the decision threshold, a bit value of "0" has been received and flow continues through a step 314 to step 322 (FIG. 18B) where it is determined whether or not a rolling code is expected.

When step 312 determines that the time difference is not less than the complement of the decision threshold flow proceeds to decision block 316 (FIG. 18B) where the result is compared to the decision threshold. When the result exceeds the decision threshold, a bit having a value 2 has been received and the flow proceeds via step 318 to the decision step 322. When decision step 316 determines that the result does not exceed the decision threshold, a bit having a value of 1 has been received and flow continues via step 320 to decision step 322.

Figure 18C:
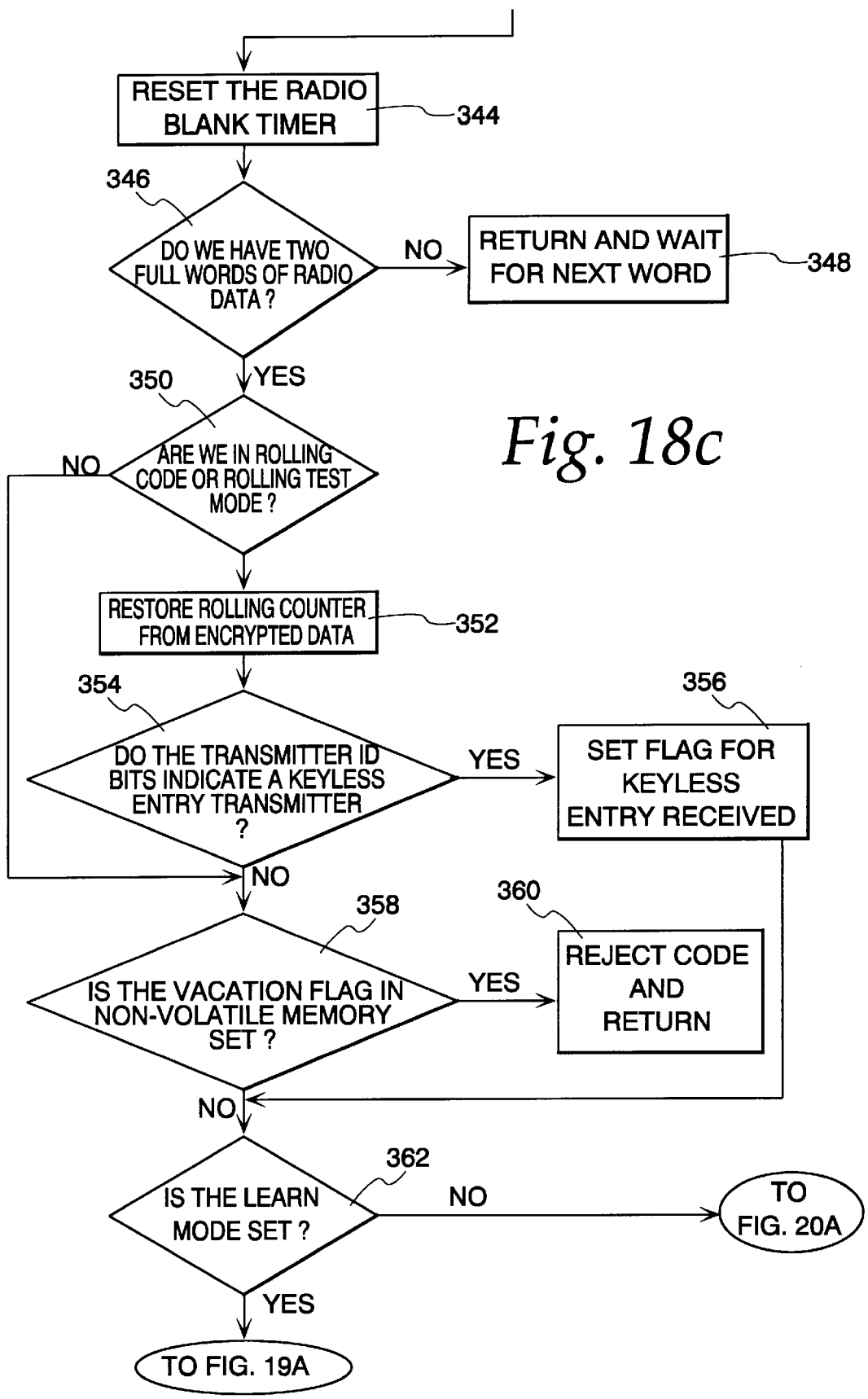

In step 322, microprocessor 85 identifies if rolling codes are expected. If not, flow proceeds to step 338 (FIG. 18C) where the bit value is stored as a fixed code bit. When rolling codes are expected, flow continues from block 322 to a decision step 324 where the bit count is checked to identify whether a fixed code bit or a rolling code bit is received. When step 324 identifies a rolling code bit, flow proceeds directly to a step 340 (FIG. 18C) to determine whether this is the last bit of a word. When a fixed bit is detected in step 324, its value is stored in a step 326 and a step 328 is performed to identify if the currently received bit is an ID bit. If the bit count identifies an ID bit, a step 330 is performed to store the ID bit and flow proceeds to the storage step 338 (FIG. 18C). When step 328 determines that the currently received bit is not an ID bit, flow continues to step 334 (FIG. 18C) to determine whether the currently received bit is a function bit. If it is a function bit, its value is stored as a function indicator in step 336 and flow continues to step 338 for storage as a fixed code bit. When step 334 indicates that the currently received bit is not a function bit, flow proceeds directly to step 338. After the storage step 338, flow for the fixed bit reception also proceeds to step 340 to determine whether a full word has been received. Such determination is made by comparing the bit counter with the threshold values established for the type of code expected. When less than a word has been received, flow proceeds to step 342 to await other bits.

When a full word has been received, flow proceeds to a step 344 where the blank timer is reset. Thereafter, flow continues to decision step 346 to determine if two full words (a complete code) have been received. When two full words have not been received, flow proceeds to block 348 to await the digits of a new word. When two full words are detected in step 346, flow proceeds to step 350 (FIG. 18D) to determine whether rolling codes are expected. When rolling codes are not expected, flow continues to step 358. When rolling codes are expected, flow proceeds from step 350 through restoration of the rolling code in a step 352 to a decision step 354 where it is identified if the ID bits indicate a keyless entry transmitter, e.g., transmitter 34. When a keyless entry transmitter code is detected, a flag is set in step 356 and flow proceeds to a decision step 362, discussed below. When step 354 indicates that the code is not from a keyless transmitter, flow continues to the decision step 358 to identify whether a vacation flag is set in memory. The vacation flag is set in response to a human activated vacation switch and when the vacation flag is set, no radio codes are allowed to activate the door open while codes from keypad (keyless) transmitters such as 34 are permitted to activate the system. Accordingly, if a vacation flag is detected in step 358, the code is rejected and a return is performed. When no vacation flag has been set, flow proceeds to a step 362 where it is determined if a learn mode is set. Learn modes can be set by several types of operator interaction. The program switch 151 can be pressed. Also, by preprogramming, microprocessor 85 is instructed to interpret the press and hold of the command and light buttons of the wall control 39 while energizing a code transmitter. Additionally, prior radio commands can place the system in a learn mode. The decision at step 362 is not dependent on how the learn mode is set, but merely on whether a learn mode is requested. At this point it is assumed that a learn mode has been set and flow continues to step 750 (FIG. 19A).

Figure 19B:
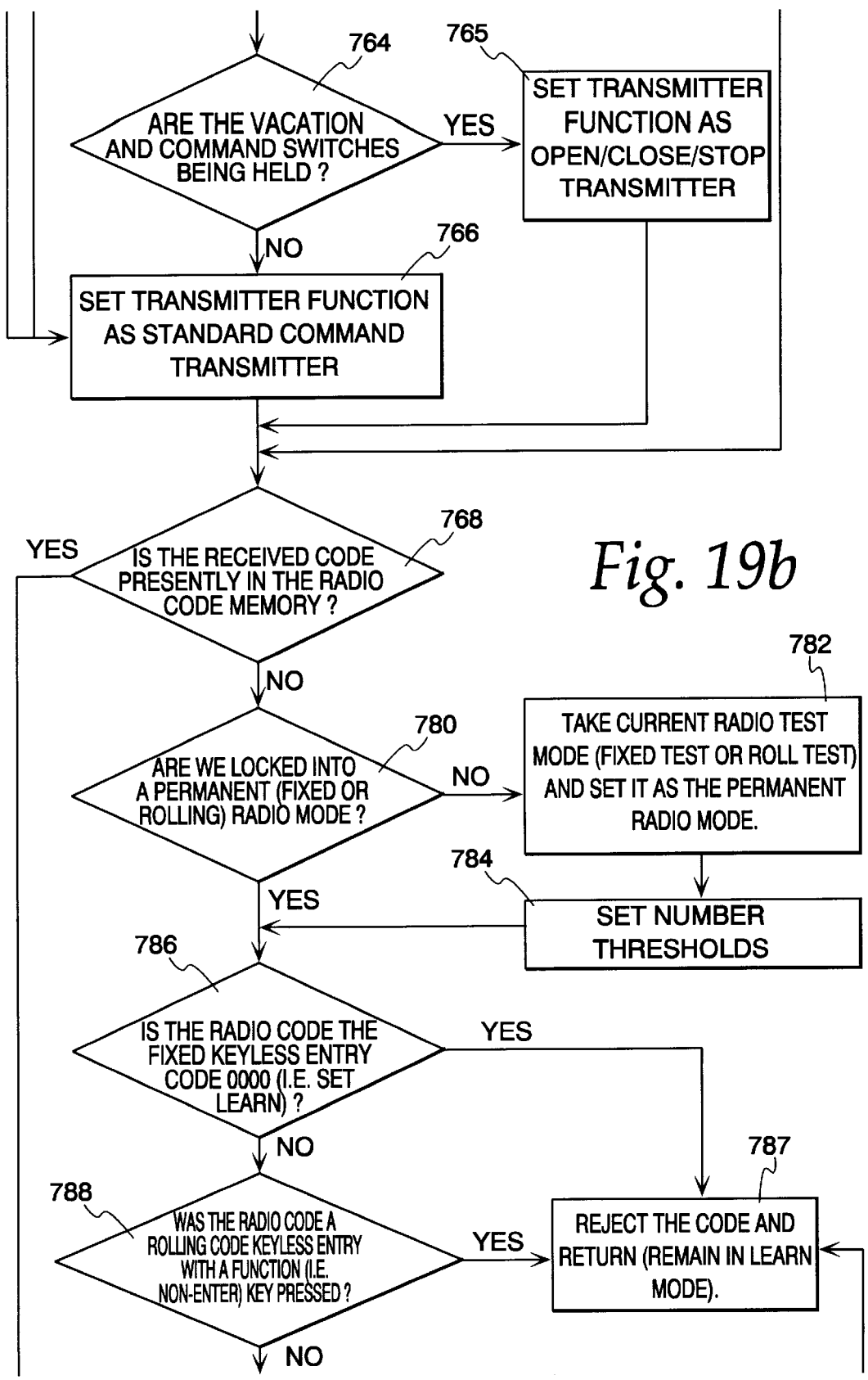

In step 750, a determination is made concerning the type of code expected. When a fixed code is expected, flow proceeds to step 756 where the present fixed code is compared with the prior fixed code. When step 756 does not detect a match, the present code is stored in a past code register and a return is executed. When step 750 identifies that rolling code is expected, a step 752 is performed to determine if the present rolling code matches the past rolling code. If no match is found, flow proceeds to step 754 where the present code is stored in a past code register and a return is executed. When step 752 determines that the rolling codes match, the fixed portion of the received rolling code is compared with the past fixed portions in step 756. When no match is detected, the code is stored in a past code register and a return is executed. When step 756 detects a match, flow proceeds to step 758 to identify if the learn was requested from the wall control 39. If not, flow proceeds to step 766 (FIG. 19B) where the transmitter function is set to be a standard command transmitter. When step 758 determines that the learn mode was commenced from wall control 39, flow proceeds to step 760 to determine whether fixed or rolling codes are expected. When fixed codes are expected, flow proceeds to step 766 (FIG. 19B) where the function is set to be that of standard command transmitter. When rolling codes are identified in step 760, flow proceeds to step 762 (FIG. 19B).

Figure 19C:
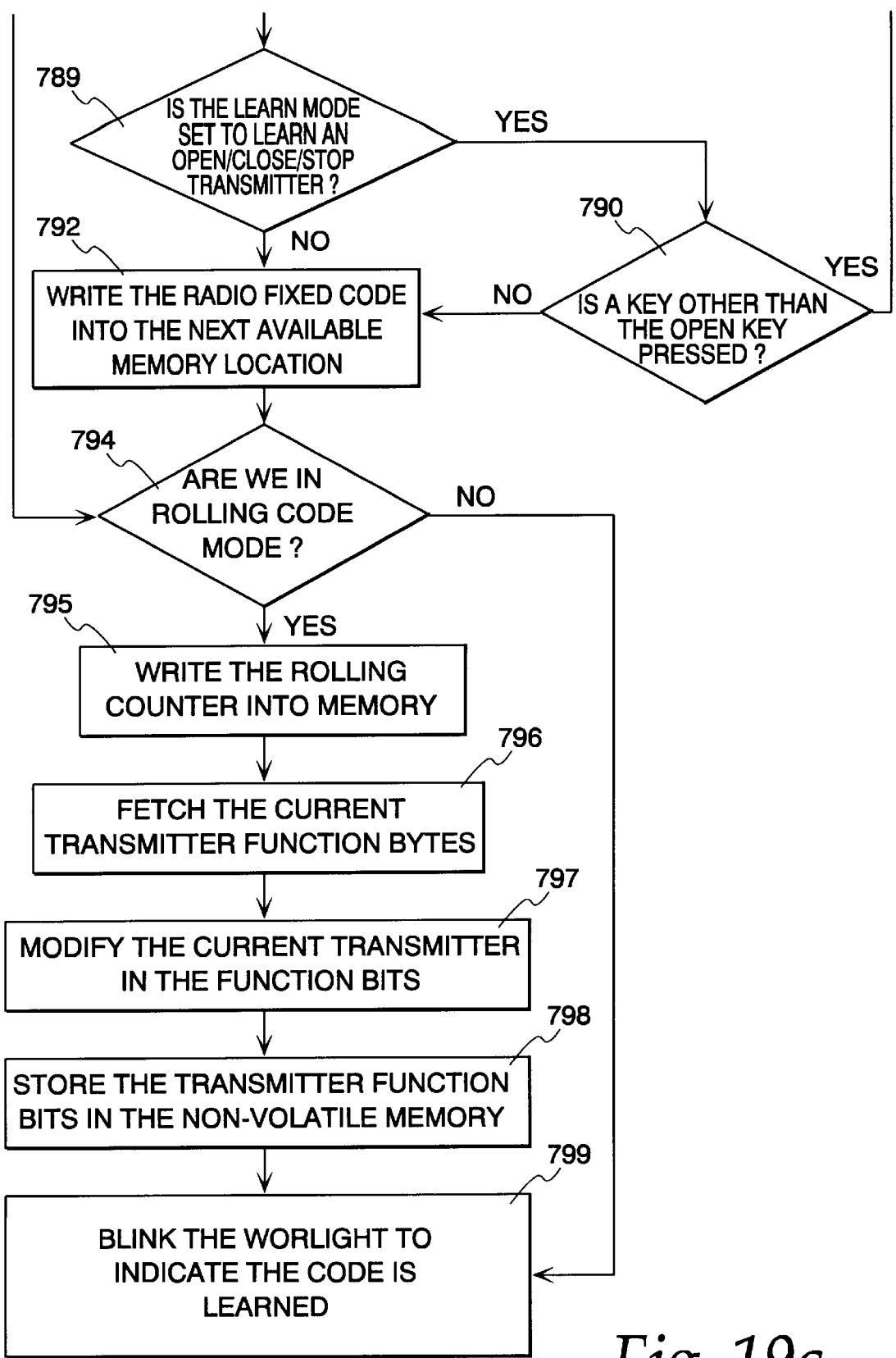

In step 762 it is determined if the light and vacation switches of the wall control 39 are being held. If so, the transmitter is set to be a light switch only in step 763 and flow proceeds to step 768. When step 762 is answered in the negative, flow proceeds to step 764 to determine if the vacation and command switches are being held. If they are, flow proceeds to step 765 to set the transmitter function as open/close/stop and flow proceeds to step 768. When step 764 determines that the vacation and command switches are not being held, flow proceeds to step 766 where the transmitter is marked as a standard command transmitter. After step 766, a step 768 is performed to identify if the received code is in the radio code memory. If the present code is in radio code memory, flow proceeds to step 794 (FIG. 19C). If the received code is not in radio code memory, flow proceeds from step 768 to 780 to determine whether the system is in a permanent or a test mode. When step 780 determines that the system is in a test mode, the current radio mode, either fixed or rolling, is set as a permanent mode in step 782 and flow proceeds to a step 784 to set the current thresholds by storing a pointer to the storage location in ROM into permanent memory.

After step 784, flow proceeds to step 786 (FIG. 19C) to determine if the present code is from the keypad transmitter and specifies an input code 0000. If so, the step 787 is executed where the received code is rejected and a return is executed while remaining in the learn mode. When the code 0000 is not present, flow continues to step 788 to find whether a non-enter key (* or #) was pressed. If so, flow proceeds to step 787. If not, flow continues to decision step 789 to identify if an open/close/stop transmitter is being learned. When the present learning does not involve an open/close/stop transmitter, flow proceeds to step 792 where the code is written into nonvolatile memory. When step 789 determines that an open/close/stop transmitter is being learned, flow proceeds to step 790 to determine if a key other than the open key is being pressed. If so, flow proceeds to block 789 and if not, flow proceeds to block 792 where the fixed code is stored in nonvolatile memory.

After step 792, step 794 is performed to determine if rolling code is the present mode. If not, flow proceeds to step 799 where the light is blinked to indicate the completion of a learn and a return is executed. When step 794 identifies the mode as rolling code, flow proceeds to step 795 where the received rolling code is written into nonvolatile memory in association with the fixed code written in step 792. After step 795, the current transmitter function bytes are read in step 796, modified in step 797 and stored in nonvolatile memory. Following such storage, the work light is blinked in step 799 and a return is executed.

Figure 20A:
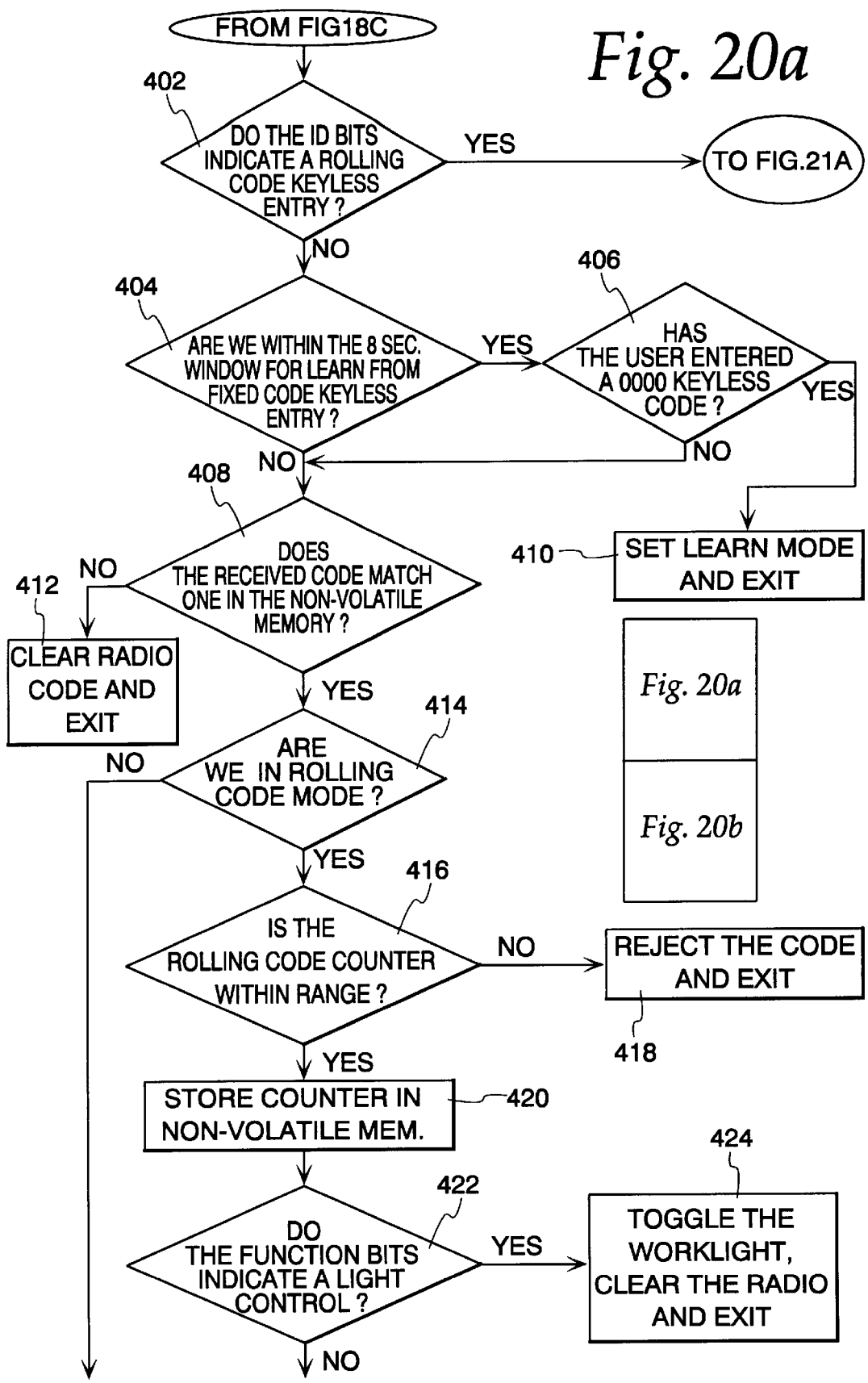
Figure 21A:
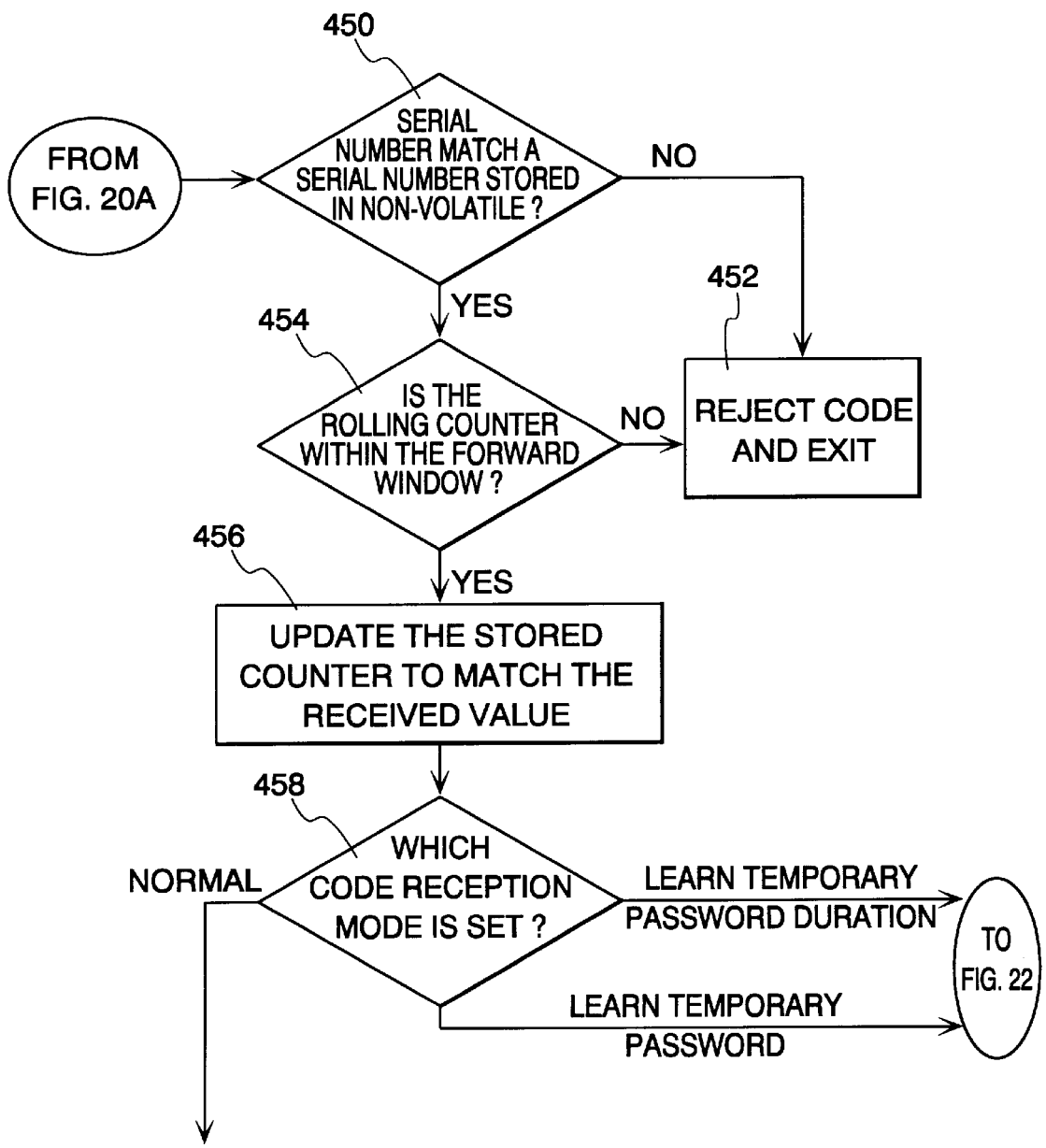

The performance of step 799 concludes the learn function which began when step 362 (FIG. 18D) identified a learn mode. When step 362 does not identify a learn mode, flow proceeds from step 362 to step 402 (FIG. 20A). In step 402 the ID bits of the received code are interpreted to identify whether the code is from a rolling code keypad type transmitter, e.g. 34. If so, flow proceeds to step 450 (FIG. 21A). When the ID bits do not indicate a rolling code keypad entry, flow proceeds to a step 404 where a check is made to see if an 8 second window in which a learn mode may be set exists which was entered from a fixed code keypad transmitter. When the learn mode exists, flow proceeds to step 406 to determine if the operator has entered a special "0000" code. If the special code has been entered, flow proceeds from step 406 to step 410 where the learn mode is set and an exit performed. When step 406 does not detect the special "0000" code, flow proceeds to a step 408, which step is also entered when no 8 second learn mode was detected in step 404.

Figure 20B:
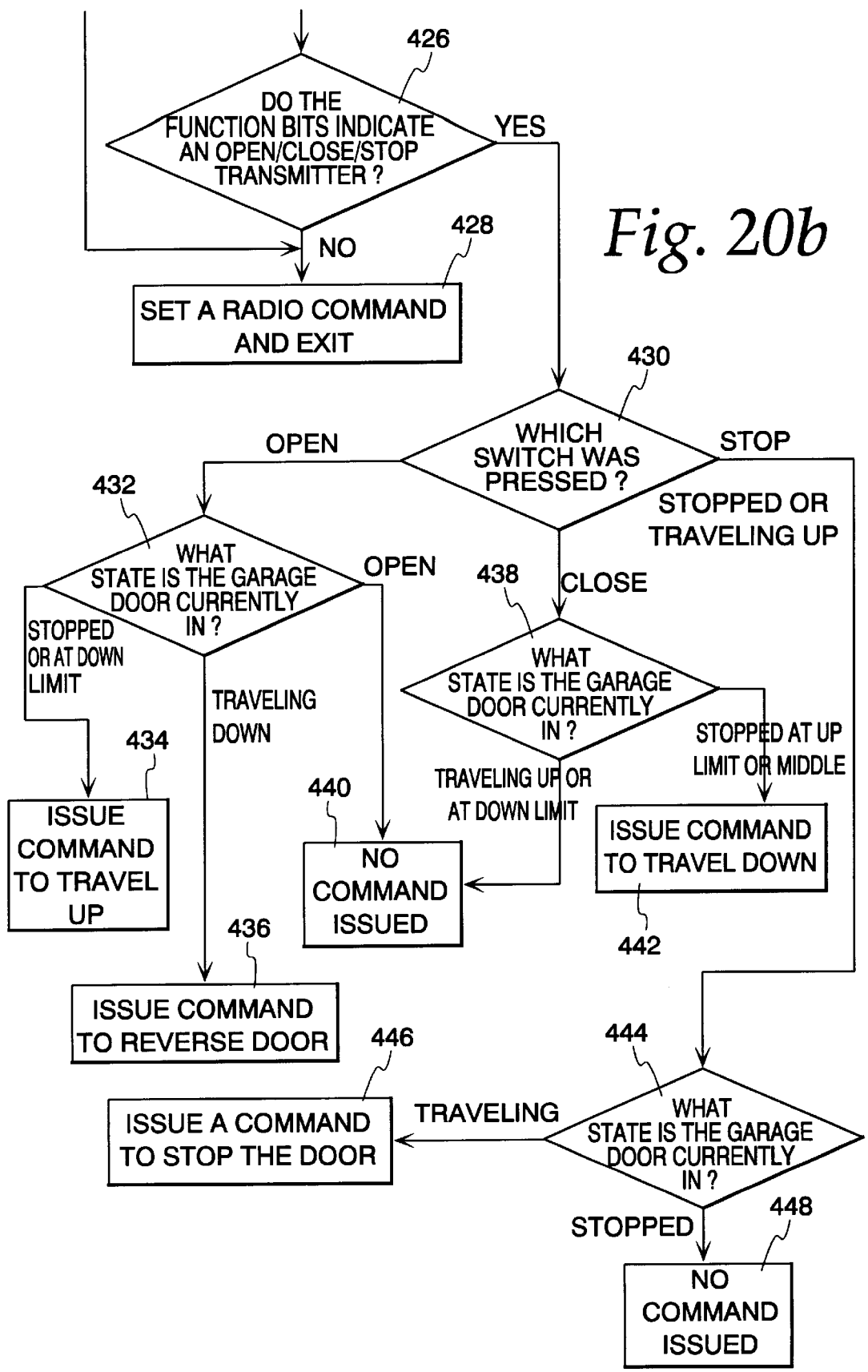

In step 408 the received code is compared with the codes previously stored in nonvolatile memory 88. When no match is detected, the radio code is cleared and an exit is performed in step 412. Alternatively, when step 408 detects a match, flow proceeds to step 414 (FIG. 20B) which identifies when rolling codes are expected. When step 414 determines that rolling codes are not expected, flow proceeds to step 428 where a radio command is executed and an exit performed. When step 414 determines that a rolling code is expected, flow proceeds to step 416 to determine if the rolling portion of the received code is within the accepted range. When the rolling portion is out of range, step 418 is performed to reject the code and exit. When the rolling code is within the range, step 420 is performed to store the received rolling code portion (rolling code counter) in nonvolatile memory and flow proceeds to a step 422, which identifies whether the function bits of the received code identify a light control signal. When a light control signal is identified, flow proceeds to step 424 where the status of the light is changed, the radio is cleared and an exit performed. When the presently received code is not identified in step 422 as a light control, flow proceeds to step 426 to identify if the present code is an open/close/stop command. When step 426 does not identify an open/close/stop command, flow proceeds to the step 428 where a radio command is set and an exit performed.

When step 426 identifies an open/close/stop command, flow proceeds to step 430 (FIG. 20C) to interpret the command. Step 430 identifies from the function bits of the received code which of the three buttons was pressed. When the open button was pressed, flow proceeds to a step 432 to identify what the present state of the door is. When the door is stopped or at a down limit, step 434 is entered where an up command is issued and exit performed. When step 432 identifies that the door is traveling down, a reverse door command is issued and an exit performed in step 436. In the third case, when step 432 detects the door to be open, step 440 is entered and no command is issued.

When step 430 identifies that the close transmitter button was pressed, flow proceeds to step 438 to identify what state the door is in. When step 436 determines that the door is traveling up or at a down limit, the step 440 is performed where no command is issued and an exit performed. Alternatively, when step 438 identifies that the door is stopped at other than the down limit, a down command is issued in a step 442. When step 430 determines that the stop button was pressed, slow proceeds to step 444 to identify the state of the door. When the door is already stopped, flow proceeds from step 444 to step 448 where no command is issued and an exit performed. When the door is identified in step 444 as traveling, a stop command is issued in step 446 and an exit performed.

It will be remembered that when step 402 (FIG. 20A) identifies that a rolling code keypad code is received, flow proceeds to step 450 (FIG. 21A). In step 450 the serial number portion of the received code is compared with the serial numbers of those codes stored in nonvolatile memory. When no match is detected, flow proceeds to step 452 where the code is rejected and an exit performed. When step 450 detects a match, flow proceeds to step 454 to identify if the rolling code portion is within the forward window. When the code is not within the forward window, flow proceeds to the step 452 where the received code is rejected and an exit is performed.

Figure 21B:
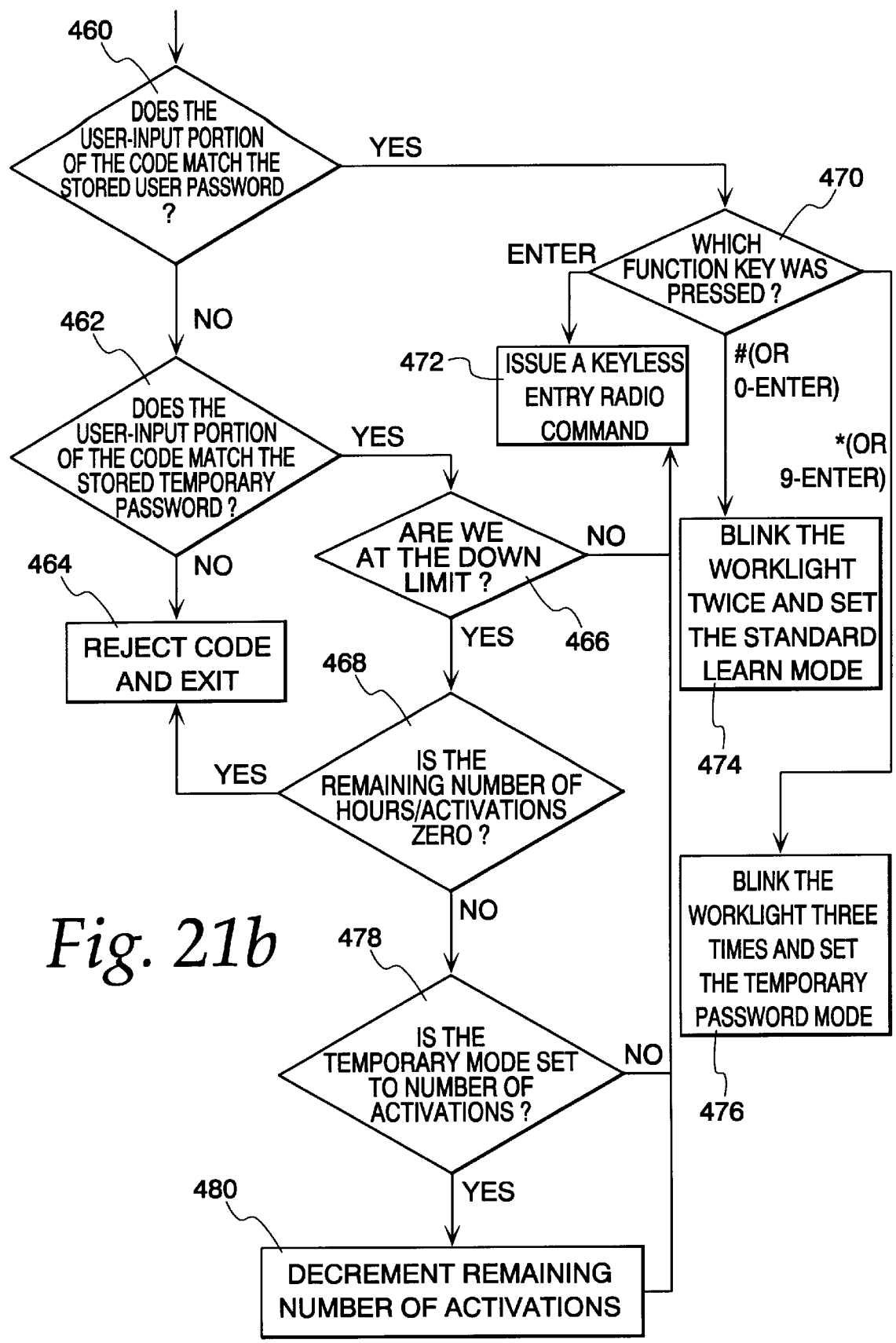

When the received rolling code portion is found to be within the forward window in step 454 a step 456 is performed where the received code is used to update the rolling code counter in memory. This storage keeps the rolling code transmitter and rolling code receiver in synchronism. After step 456, a step 458 is entered to identify which code reception mode has been set. When normal code reception is identified in step 458, a step 460 (FIG. 21B) is performed to identify if the user input portion of the received code matches a stored user password. When a match is detected in step 460, flow proceeds to step 470 to identify which of the keypad input keys, *, # or enter, was pressed. When step 470 identifies the enter key, a step 472 is performed in which a keyless entry command is issued and an exit initiated. When the * key is detected in step 470, flow proceeds to step 476 where the light is blinked and the learn temporary password flag is set to identify the learn temporary password mode. When step 470 identifies that the # key was pressed, flow proceeds to a step 474 to blink the light and to set a standard learn mode.

When the performance of step 460 determines that the received user input portion does not match one stored in memory, flow proceeds to step 462 where the received user input portion is compared to temporary user input codes. When step 462 does not discover a match, a step 464 is performed to reject the code and exit. When step 462 identifies a match between a received user input code and a stored temporary password, flow proceeds to step 466 to identify whether the door is at the down limit. If not, flow proceeds to step 472 for the issue of a keypad entry command. When step 466 identifies that the door is closed, a step 468 is performed to identify whether the previously set time or number of uses for the temporary password has expired. When step 468 identifies expiration, the step 464 is performed to reject the code and exit. When the temporary password has not expired, flow proceeds to step 478 (FIG. 21C) where the type of user temporary password, e.g., duration or number of activations, is checked. When step 478 identifies that the received temporary password is limited to a number of activations, a step 480 is executed to decrement the remaining activations and a step 472 is executed to issue an entry command. When step 478 identifies that the received keypad password is not based on the number of activations (but instead on the passage of time) flow proceeds from step 478 to the issuance of an entry command in step 472. No special up date is needed for timed temporary passwords since the microcontroller 85 continuously updates the elapsed time.

Figure 22:
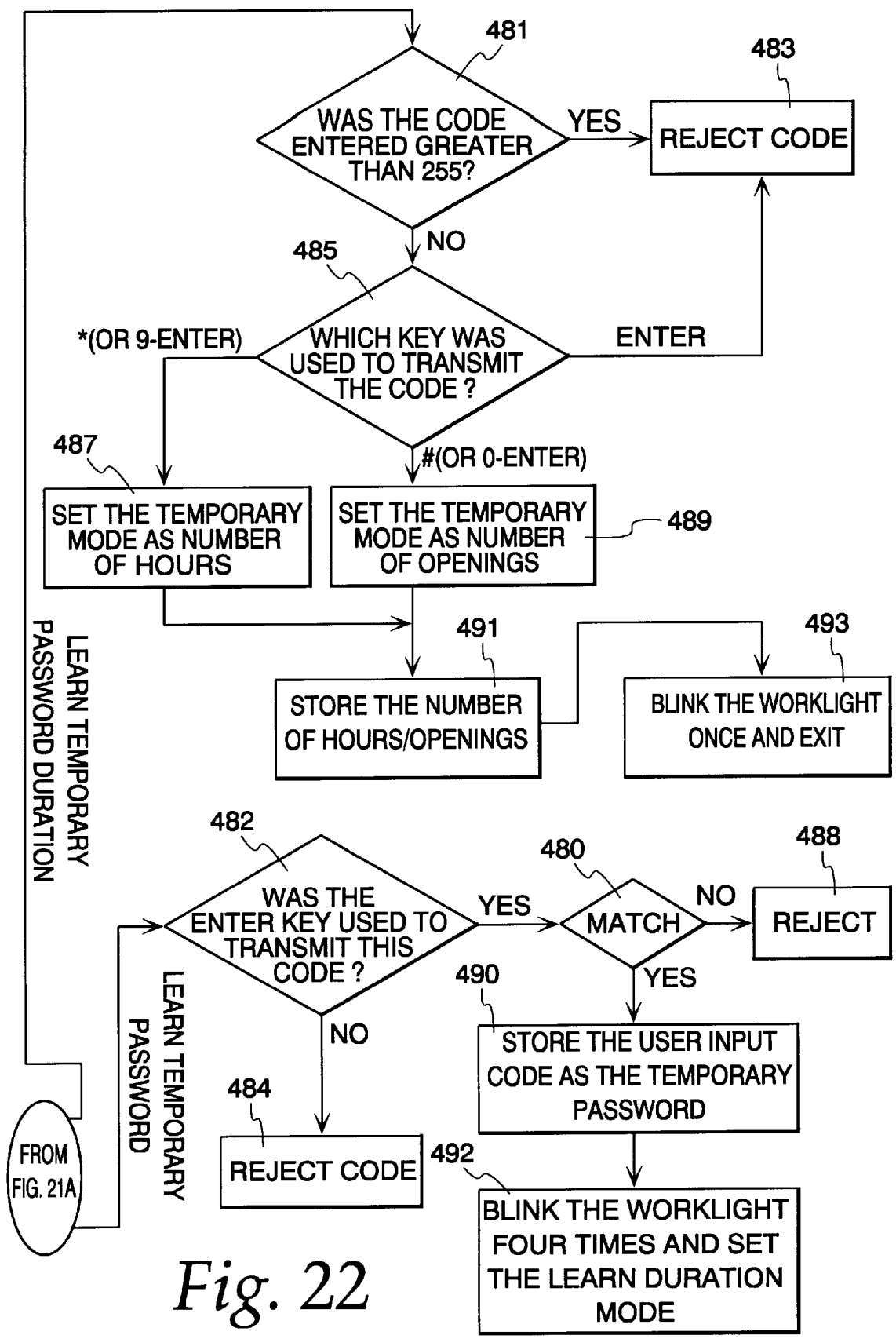

It will be remembered that a step 458 (FIG. 21A) was initiated to identify the reception mode presently enabled. When the learn temporary password mode is detected, flow proceeds from step 458 to step 482 (FIG. 22). In step 482 a query is performed to determine the enter key was used to transmit the received code. When the enter key was not used, a step 484 is performed to reject the code and exit. When the enter key was used, a step 486 is performed to determine whether the received user input code matches a user code already stored in memory. If so, a step 488 is performed to reject the code. When step 486 identifies no matching user input codes, the new user input code is stored as the temporary password in step 490 and flow proceeds to step 492 where the light is blinked and the learn temporary password duration learn mode is set for subsequent use. When the learn temporary password duration mode is later detected in step 458, flow proceeds to a step 481 where the user entered code is checked to see if it exceeds 255. This is an arbitrary limit to either 255 activations or 255 hours of temporary access. When the user entered code exceeds 255 it is rejected in step 483. When the user entered code is less than 255, a step 485 is performed to identify which key was used to transmit the keypad code. When the * key was used, the transmitted code is to indicate a time duration for the temporary password the time duration mode is set in step 487 and a time is started in step 491 using the code as the number of hours in the temporary code duration. When step 485 determines that the # key was used to transmit the code, a flag is set in step 489 indicating that the temporary mode is based on the number of activations and the number of activations is recorded in step 491. After step 491, the light is blinked and an exit is performed.

Figure 23:
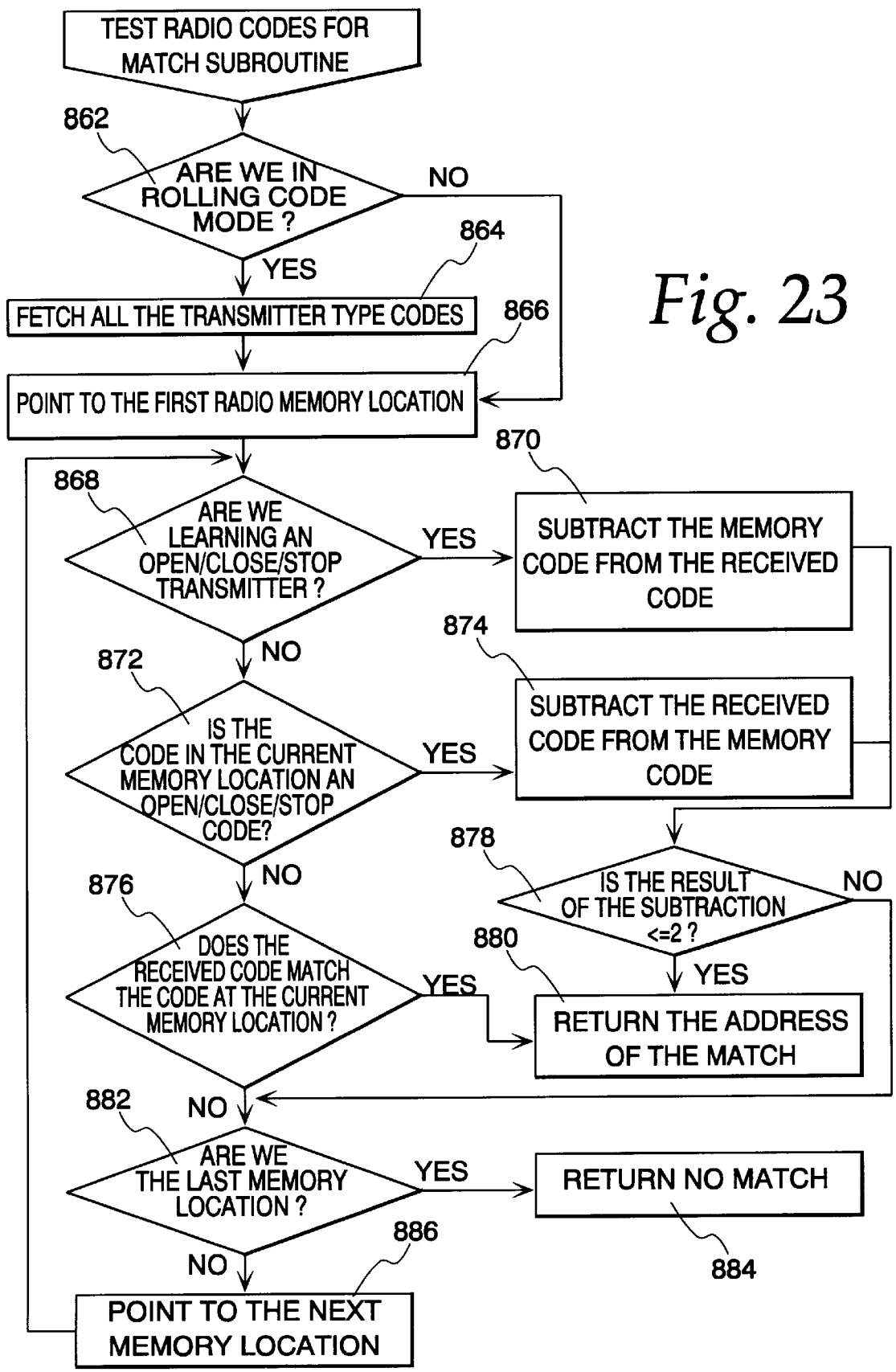
FIGS. 23A and 23B are flow diagrams of a test radio code subroutine used in the system of FIG. 3.

FIGS. 23A and 23B are flow diagrams of a radio code match subroutine. The flow begins at a step 862 where it is determined whether a rolling code is expected or not. When a rolling code is not expected, flow proceeds to a step 866 where a pointer identifies the first radio code stored in nonvolatile memory. When step 866 determines that a rolling code is expected, all transmitter type codes are fetched in a step 864 before beginning the pointer step 866. After step 866, a decision step 868 is performed to determine whether an open/close/stop transmitter is being learned. If so, a step 870 is performed in which the memory code is subtracted from the received code and the flow proceeds to a step 878 to evaluate the result. From step 878 the flow proceeds to a step 878 to evaluate the result. From step 878, the flow proceeds to a step 880 to return the address of the match when the result of the subtraction is less than or equal to two. When the result of the subtraction is not less than or equal to two, the flow continues from step 878 to step 882 to determine if the last memory location is being compared. If the last memory was compared, step 884 is performed to return a "no match."

When step 868 indicates that the system is not learning an open/close/stop transmitter, flow continues to step 872 to determine if the memory code is an open/close/stop code. If it is, flow proceeds through steps to step 874 where the received code is subtracted from the memory code. Thereafter, flow proceeds through step 878 to either step 880 or 882 as above described. When step 872 determines that the current memory code is not an open/close/stop code, flow proceeds to step 876 (FIG. 23B). In step 876 the received code is compared with the code from memory and, if they match, step 880 is performed to return the address of the matching code. When step 876 determines that the compared codes do not match, flow continues to step 882 to determine if the last memory location has been accessed. When the last memory location is not being accessed, the pointer is adjusted to identify the next memory location and the flow returns to step 868 using the contents of the new location. The process continues until a match is found or the last memory location is detected in step 882.

Figure 24:
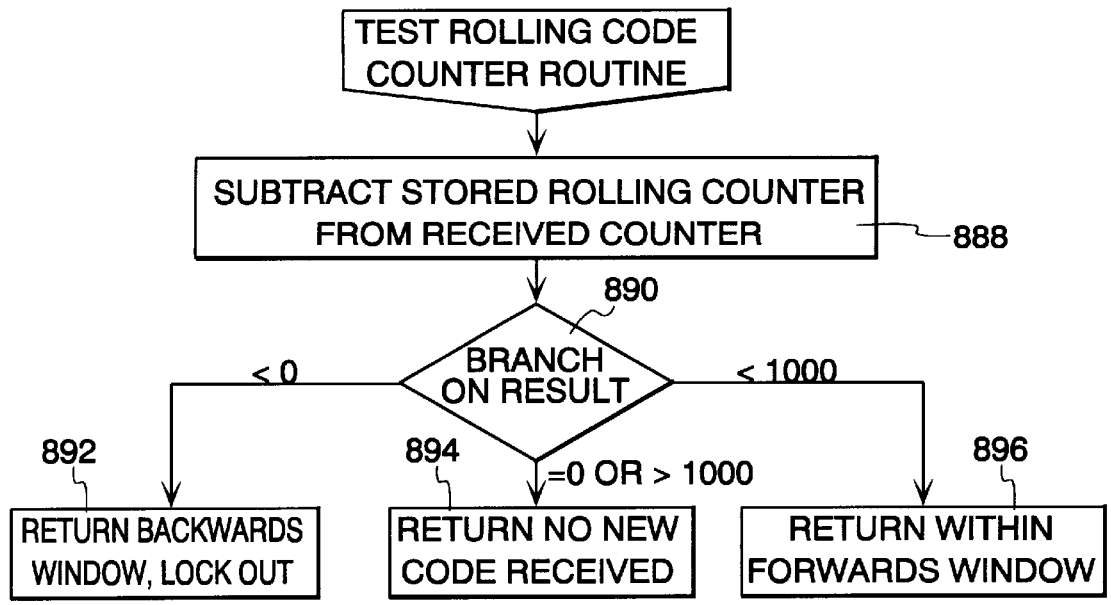
FIG. 24 is a flow diagram of a test rolling code counter subroutine.

FIG. 24 is a flow diagram of a test rolling code counter subroutine which begins at a step 888 in which the stored rolling code counter is subtracted from the received rolling code and the result is analyzed in a step 890. When step 890 determines that the subtraction result is less than "0", flow continues to step 892 where the subroutine returns a backward window lockout. When step 890 determines that the subtraction result is greater than 0 and less than 1000, the subroutine returns a forward window indication in step 892.

Figure 25:
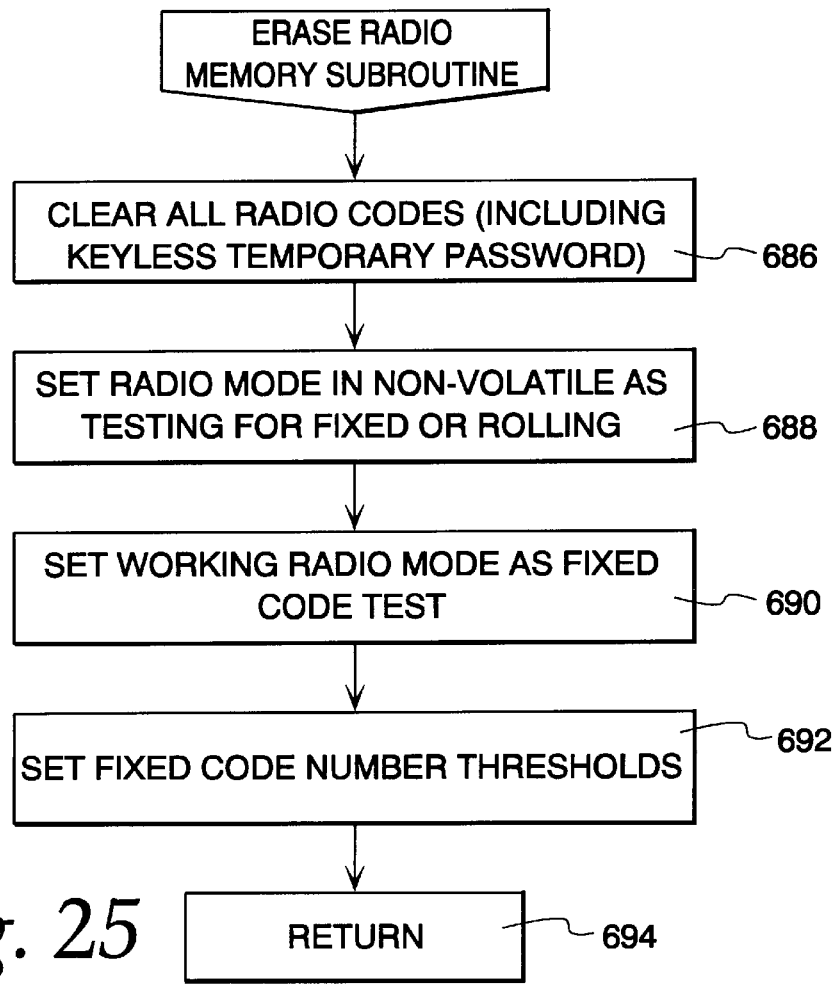
FIG. 25 is a flow diagram of an erase radio memory subroutine.

FIG. 25 is a flow diagram of an erase radio memory routine which begins at a step 686 of clearing all radio codes, including keyless temporary codes. Next, a step 688 is performed to set the radio mode in nonvolatile memory as testing for rolling codes or testing for fixed codes. Step 690 is next performed in which the working radio mode is set as fixed code test and the fixed code number thresholds are set in a step 692. A return step 694 completes the subroutine.

Figure 26:
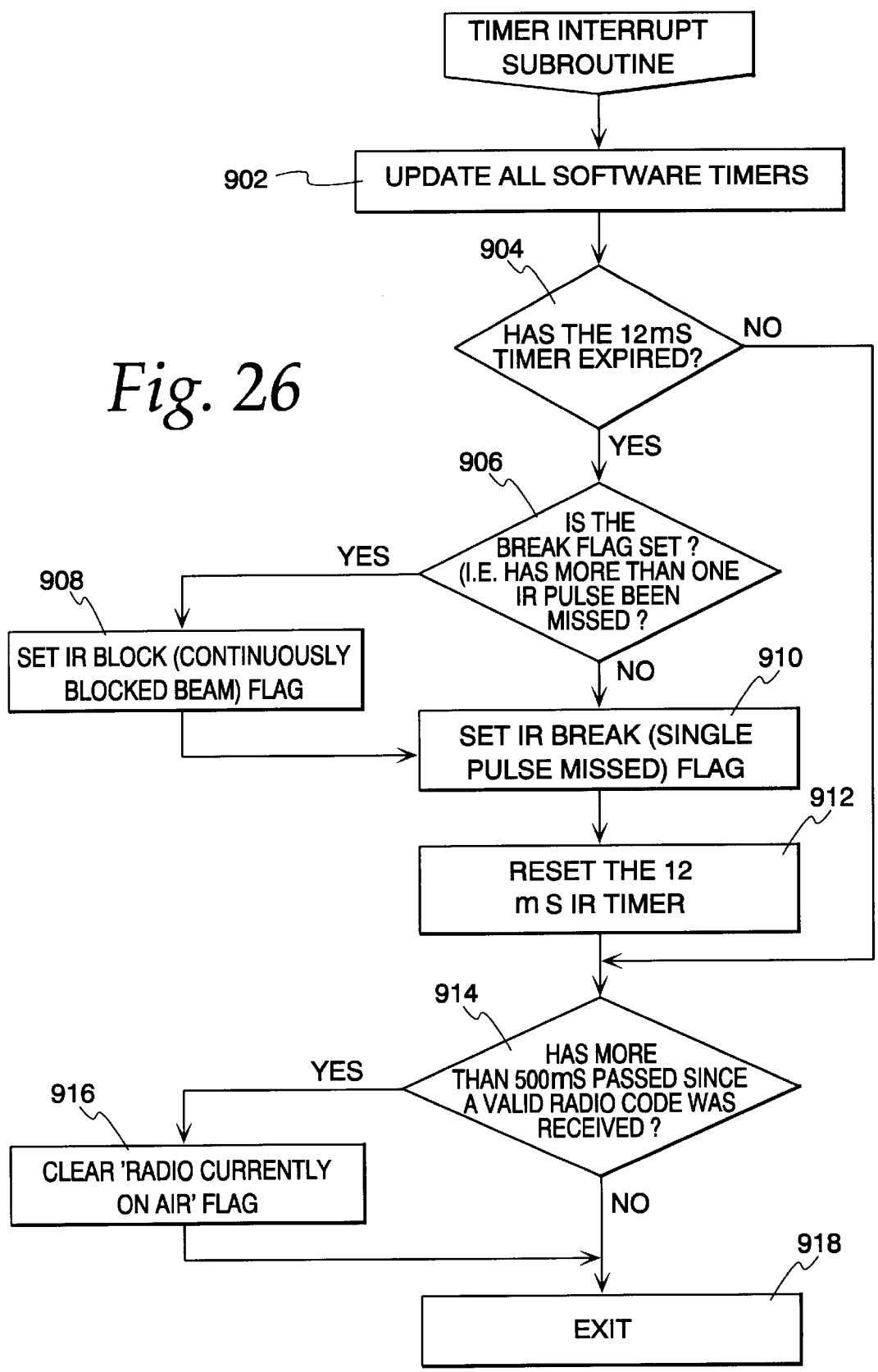
FIGS. 26A and 26B are flow diagrams of a timer interrupt subroutine.

FIGS. 26A and 26B show a timer interrupt subroutine which begins at a step 902 when all software times are updated. Next, flow proceeds to a step 904 to determine whether a 12 millisecond timer has expired. The 12 millisecond timer is used to assure that obstructions which block the light beam in protector 90 and cause the absence of a 10 millisecond obstructive pulse, are rapidly detected. When the 12 millisecond timer has not expired, flow proceeds to a step 914 discussed below. Alternatively, when the timer expires, a step 906 is performed to determine if a break flag, which is set at the first missed pulse, is set. If it is not set, flow proceeds to step 910 in which the break flag is set. If the break flag was detected in step 906, flow continues to step 908 in which an IR block flag, indicative of a plurality of missed 10 millisecond obstruction pulses, is set. Flow then proceeds through step 910 to step 912 where the 12 millisecond timer is reset. Decision step 914, which is performed after step 912, determines whether it has been more than 500 milliseconds since a valid radio code has been received. If more than 500 milliseconds has transpired, step 916 is performed to clear a radio currently on air flag and an exit is performed. When step 914 determines that 500 milliseconds has not expired, flow proceeds directly to exit step 918.

Figure 27:
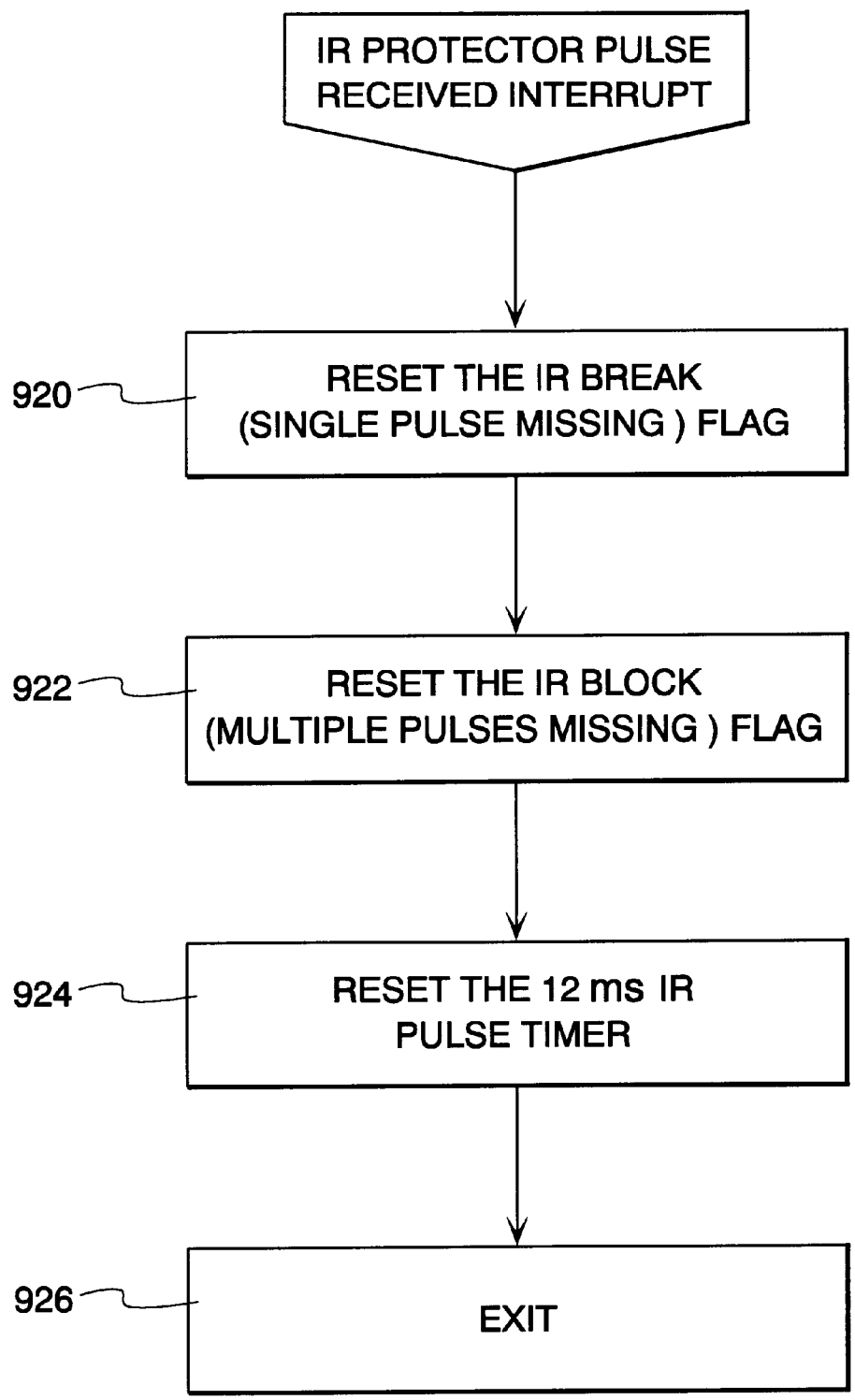
FIG. 27 is a flow diagram of a protector pulse received routine.

FIG. 27 is a flow diagram of an IR pulse received interrupt begun whenever a protection pulse is received by microcontroller 85. Initially, a step 920 is performed in which the IR break flag is reset and the flow proceeds to step 922 where the IR block flag is reset. This routine ends by resetting the 12 millisecond timer in step 924 and exiting in step 926.

Figure 28:
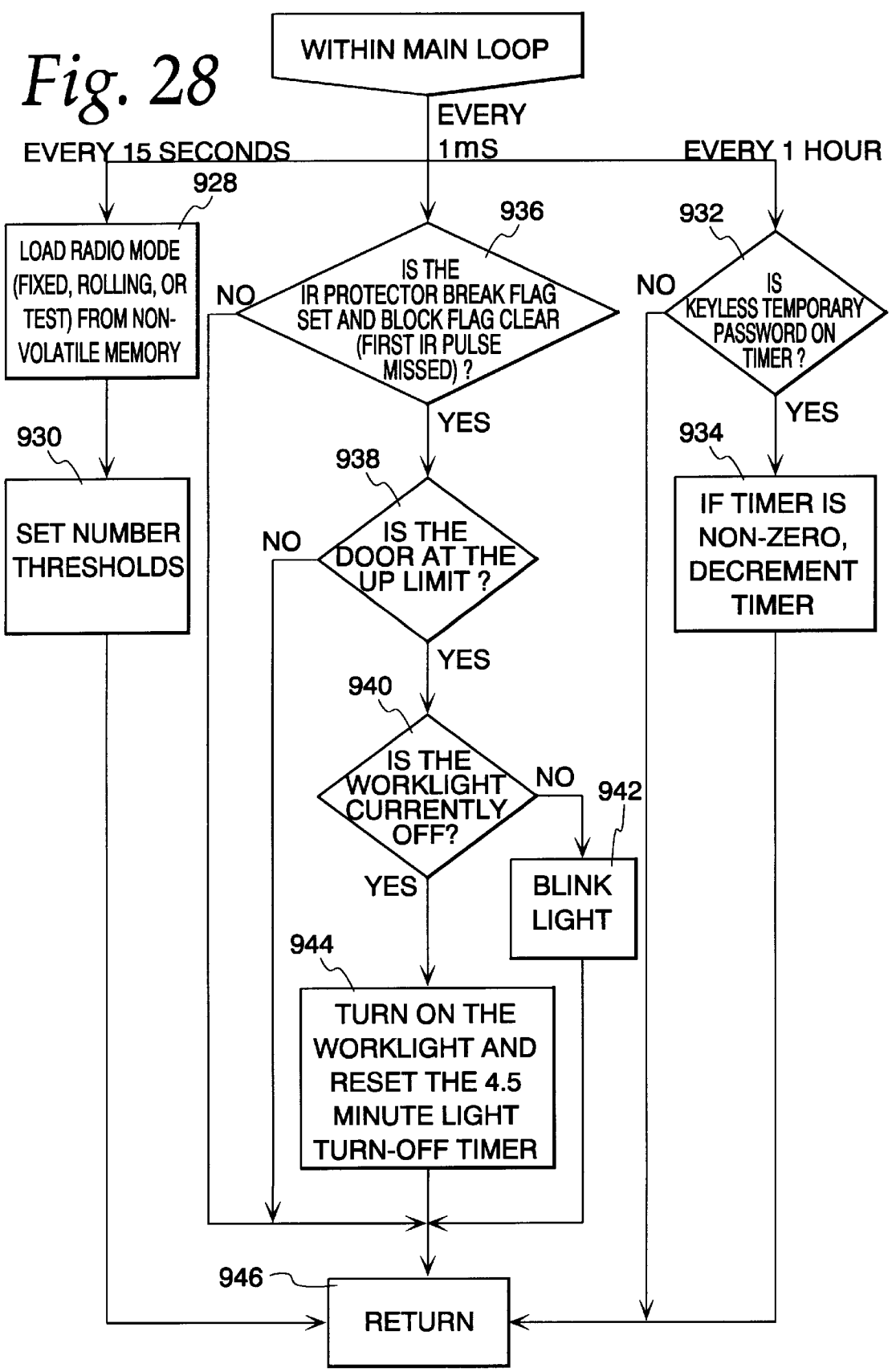
FIG. 28 is a flow diagram of routines periodically performed in the main programmed loop.

The control structure of the present embodiment includes a main loop which is substantially continuously executed. FIG. 28 is a flow diagram showing portions of the loop. Every 15 seconds a step 928 is performed in which the local radio mode is loaded from nonvolatile memory and the number thresholds are set in a step 930. This activity ends with a return step 946. Every hour a step 932 is performed to determine if a keypad temporary timer is currently active. If so, flow proceeds to step 914 where the time is decremented and a return is executed at step 946.

Every 1 millisecond a step 936 is performed to determine if the IR break flag is set and the IR block flag is not set. This condition is indicative of the first missed protector pulse. If the determination in step 936 is negative, a return is performed. If step 936 detects only the IR break flag and not the IR block flag, a step 938 is performed to identify if the door is at the up limit. When the door is not at the up limit, a return is performed. When step 938 detects the door at the up limit, a step 940 is performed to identify if the light is on. If the light is on, it is blinked a predetermined number of times in step 942 and a return is executed. When step 940 determines that the light is off a step 944 is performed to turn the light on and set a 4.5 minute light keep on timer. A return is executed after step 944.

Figure 29:
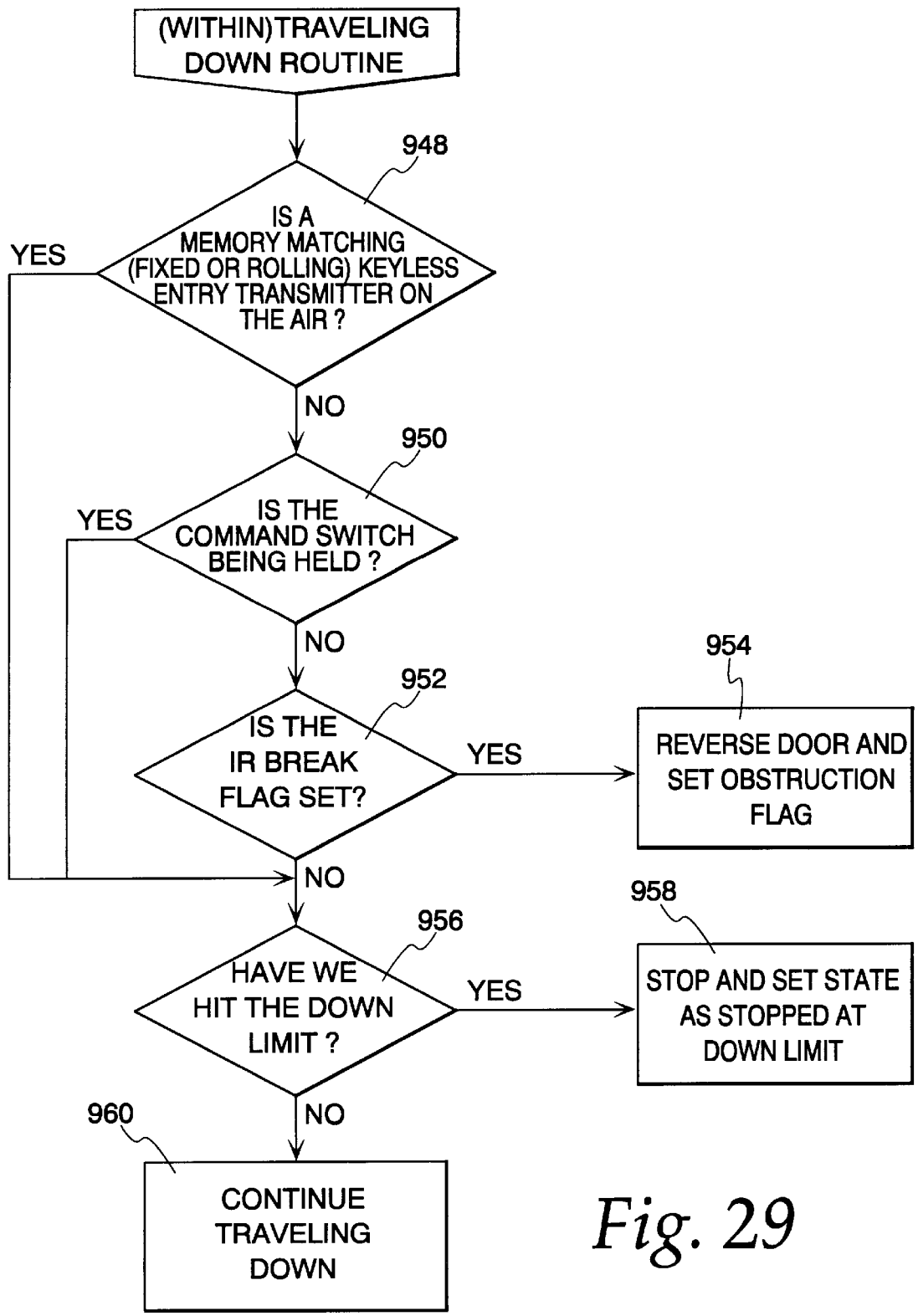
FIG. 29 is a flow diagram of portions of a travelling down routine.

FIG. 29 is a flow diagram illustrating the use of the IR protection circuit in door control. At a step 948 a decision is made whether a memory matching keypad type transmitter is on the air. If so, flow proceeds to step 956 to determine if the down limit of door travel has occurred. If the down limit has been reached, a step 958 is performed to set a stopped at down limit state of the door. When step 956 determines that the down limit has not been reached, a step 960 is performed to continue the downward travel of the door. When step 948 is answered in the negative, a step 950 is performed to determine if the command switch is being held down. If it is, flow proceeds to step 956 and either step 958 or 960 as discussed above. When step 950 is answered in the negative, a step 952 is performed in which the IR break flag is checked. If the break flag is set, signalling an obstruction, a step 954 is performed to reverse the door, set the new state of the door and set an obstruction flag. When step 952 does not detect an IR break flag, flow proceeds to step 956 as above described. It should be mentioned that the conditions established in steps 948 and 950 are intended to allow the operator to override the obstruction detector.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention. By way of example, the transmitter and receivers of the disclosed embodiment are controlled by programmed microcontrollers. The controllers could be implemented as application specific integrated circuits within the scope of the present invention.

What is claimed is:

1. A garage door operator with light control, comprising:

a garage door movement apparatus for moving the garage door in an open and in a close direction within a doorway;

a light having an on and an off state;

a controller for generating a door movement signal for operating the door movement apparatus and for generating a light enable signal for operating the light in one of a plurality of on and off states;

an obstacle detection apparatus for detecting the presence of an obstruction in the doorway;

apparatus for storing a state of the door and for generating a door state signal, wherein a state of the door is selected from the group consisting of traveling open, traveling closed and stopped open;

wherein the controller, responsive to a door state signal indicating traveling open or traveling closed, generates a door movement signal for enabling movement of the door in the commanded direction and generates a light enable signal for enabling the light in an on state for a predetermined period of time;

wherein the controller, responsive to a door state signal indicating traveling close and responsive to the detection of an obstruction in the doorway, generates an auto-reverse signal for enabling movement of the door in the open direction; and wherein the controller, responsive to a door state signal indicating stopped open and responsive to the detection of an obstruction in the doorway, generates a light enable signal for enabling the light.

2. The garage door operator of claim 1, wherein the controller, responsive to a door state signal indicating stopped open and responsive to the detection of an obstruction in the doorway, generates a light enable signal for enabling the light in an on state for a predetermined period of time when the light is in an off state.

3. The garage door operator of claim 1, wherein the controller, responsive to a door state signal indicating stopped open and responsive to the detection of an obstruction in the doorway, generates a light enable signal for enabling the light in an on state for a predetermined period of time when the light is in an off state and generates a light enable signal for enabling the light in a predetermined pattern of on and off states when the light is in an on state.

4. The garage door operator of claim 1, wherein the obstacle detection apparatus comprises an optical emitter for emitting light across the doorway and an optical detector for receiving at least a portion of the emitted light.

5. The garage door operator of claim 4, wherein the optical emitter comprises an infrared emitter and the optical detector comprises an infrared detector.

6. The garage door operator of claim 1, wherein the state of the door is selected from the group consisting of traveling open, traveling closed, stopped open and stopped closed.

7. A garage door operator with light control, comprising:

a garage door movement apparatus for moving the garage door in an open and in a close direction within a doorway;

a light having an on and an off state;

a controller for generating a door movement signal for operating the door movement apparatus and for generating a light enable signal for operating the light in one of a plurality of on and off states;

an obstacle detection apparatus for detecting the presence of an obstruction in the doorway;

wherein the controller, responsive to a door movement command generates a door movement signal for enabling movement of the door in a commanded direction and generates a light enable signal for enabling the light in an on state for a predetermined period of time;

wherein the controller, subsequent to a door close movement command and responsive to the detection of an obstruction in the doorway, generates an auto-reverse signal for enabling movement of the door in the open direction; and wherein the controller, when the door is in an open and stopped state and responsive to the detection of an obstruction in the doorway, generates a light enable signal for enabling the light in an on state for a predetermined period of time when the light is in an off state, and generates a light enable signal for enabling the light in a predetermined pattern of on and off states when the light is in an on state.

8. The garage door operator of claim 7, wherein the obstacle detection apparatus comprises an optical emitter for emitting light across the doorway and an optical detector for receiving at least a portion of the emitted light.

9. The controller of claim 8, wherein the optical emitter comprises an infrared emitter and the optical detector comprises an infrared detector.

10. A method of operating a garage door operator with light control, the operator having a garage door movement apparatus for moving the garage door in an open and in a close direction within a doorway, a light having an on and an off state and an obstacle detection apparatus for detecting the presence of an obstruction in the doorway, comprising:

responsive to a door movement command, generating a door movement signal for enabling movement of the door in the commanded direction and generating a light enable signal for enabling the light in an on state for a predetermined period of time;

detecting an obstruction in the doorway while the door is moving in a close direction, then generating an auto-reverse signal for enabling movement of the door in the open direction; and detecting an obstruction in the doorway when the door is in a stopped and open state, then, when the light is in an off state, generating a light enable signal for enabling the light in an on state for a predetermined period of time, and when the light is in an on state, generating a light enable signal for enabling the light in a predetermined pattern of on and off states.

* * * * *